(12) United States Patent
Zhang et al.

(10) Patent No.: US 9,705,775 B2
(45) Date of Patent: Jul. 11, 2017

(54) PASSIVE PERFORMANCE MEASUREMENT FOR INLINE SERVICE CHAINING

(71) Applicant: Telefonaktiebolaget L M Ericsson (publ), Stockholm (SE)

(72) Inventors: Ying Zhang, Fremont, CA (US); Joel Halpern, Leesburg, VA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 240 days.

(21) Appl. No.: 14/549,363

(22) Filed: Nov. 20, 2014

(65) Prior Publication Data

US 2016/0149788 A1    May 26, 2016

(51) Int. Cl.
H04L 12/26     (2006.01)
*H04L 12/851*  (2013.01)
*H04L 12/721*  (2013.01)

(52) U.S. Cl.
CPC .......... *H04L 43/10* (2013.01); *H04L 43/0829* (2013.01); *H04L 43/0852* (2013.01); *H04L 47/2483* (2013.01); *H04L 45/38* (2013.01)

(58) Field of Classification Search
CPC . H04L 43/10; H04L 43/0829; H04L 43/0852; H04L 43/0835; H04L 43/0858; H04L 45/38; H04L 47/2483
USPC .......................................................... 709/224
See application file for complete search history.

(56) References Cited

U.S. PATENT DOCUMENTS

| 6,904,020 B1 * | 6/2005 | Love | H04L 41/0803 370/252 |
|---|---|---|---|
| 8,073,968 B1 | 12/2011 | Shah et al. | |
| 8,611,343 B2 * | 12/2013 | Gerber | H04L 43/04 370/252 |
| 8,694,627 B2 * | 4/2014 | Gerber | H04L 43/12 709/224 |
| 8,699,344 B2 * | 4/2014 | Gerber | H04L 41/0896 370/230 |

(Continued)

FOREIGN PATENT DOCUMENTS

| CN | 101593259 B | * | 3/2011 |
| JP | 2010117994 A | * | 5/2010 |

(Continued)

OTHER PUBLICATIONS

U.S. Appl. No. 14/462,372, filed Aug. 18, 2014, Pending.

(Continued)

*Primary Examiner* — Kostas Katsikis
(74) *Attorney, Agent, or Firm* — Nicholson De Vos Webster & Elliott LLP

(57) ABSTRACT

A method is implemented by a network device to monitor the performance of packet processing in an in-line service chain, the network device one of a plurality of network devices forming a software defined network (SDN) and the in-line service chain. The SDN includes a controller to configure the plurality of network devices. The method includes receiving a sequence of packets of a data flow traversing the in-line service chain, applying a hash function to the sequence of packets of the data flow to generate a set of hash values for the sequence of packets, and sending the set of hash values and a set of timestamps for the sequence of packets to the controller to determine delay and loss across a service of the in-line service chain.

18 Claims, 13 Drawing Sheets

(56) References Cited

U.S. PATENT DOCUMENTS

| | | | | |
|---|---|---|---|---|
| 8,750,146 | B2* | 6/2014 | Gerber | H04L 43/026 370/252 |
| 8,817,625 | B1 | 8/2014 | Zhang et al. | |
| 8,923,294 | B2* | 12/2014 | Chao | H04L 45/66 370/389 |
| 9,038,151 | B1 | 5/2015 | Chua et al. | |
| 9,264,400 | B1 | 2/2016 | Lin et al. | |
| 9,319,324 | B2 | 4/2016 | Beheshti-Zavareh et al. | |
| 2003/0046388 | A1* | 3/2003 | Milliken | H04L 41/046 709/224 |
| 2008/0049775 | A1* | 2/2008 | Morrill | H04L 41/147 370/419 |
| 2010/0080226 | A1 | 4/2010 | Khalid et al. | |
| 2011/0296007 | A1* | 12/2011 | Liu | H04L 65/4069 709/224 |
| 2013/0010600 | A1 | 1/2013 | Jocha et al. | |
| 2013/0272305 | A1 | 10/2013 | Lefebvre et al. | |
| 2014/0092738 | A1* | 4/2014 | Grandhi | H04L 47/52 370/235 |
| 2014/0215074 | A1 | 7/2014 | Zhang et al. | |
| 2014/0233385 | A1* | 8/2014 | Beliveau | H04L 47/122 370/235 |
| 2014/0310388 | A1 | 10/2014 | Djukic et al. | |
| 2015/0071108 | A1* | 3/2015 | Lumezanu | H04L 43/106 370/253 |
| 2015/0092564 | A1 | 4/2015 | Aldrin | |
| 2015/0127805 | A1 | 5/2015 | Htay et al. | |
| 2015/0172186 | A1 | 6/2015 | Kizu | |
| 2015/0244617 | A1* | 8/2015 | Nakil | H04L 43/04 709/224 |
| 2015/0281028 | A1* | 10/2015 | Akhter | H04L 43/106 370/252 |
| 2016/0020973 | A1* | 1/2016 | Mishra | H04L 43/0811 370/252 |
| 2016/0050131 | A1 | 2/2016 | Zhang et al. | |
| 2016/0080263 | A1* | 3/2016 | Park | G06F 17/30345 370/392 |
| 2016/0099853 | A1 | 4/2016 | Nedeltchev et al. | |
| 2016/0149784 | A1* | 5/2016 | Zhang | H04B 1/0003 370/229 |
| 2016/0226742 | A1* | 8/2016 | Apathotharanan | H04L 43/12 |

FOREIGN PATENT DOCUMENTS

| | | | | |
|---|---|---|---|---|
| SE | WO 2013055267 | A1* | 4/2013 | H04L 43/0852 |
| SE | WO 2016079721 | A1* | 5/2016 | H04L 43/10 |

OTHER PUBLICATIONS

U.S. Appl. No. 14/549,373, filed Nov. 20, 2014, Pending.

Ohta, et al., "Passive Packet Loss Monitoring that Em-ploys the Hash-Based Identification Tech-nique," 9th IFIP/IEEE International Symposium on Integrated Network Management, May 19, 2005, pp. 1-14.

Quinn, et al., "Network Service Header; draft-quinn-sfc-nsh-02.txt," IETF Trust, Network Working Group Internet-Draft, Feb. 14, 2014, 21 pages.

Ali, Z., et al., "Node-IDS Based Resource Reservation Protocol (RSVP) Hello: A Clarification Statement", Network Working Group; RFC 4558; Jun. 2006; 7 pages.

Andersson, L., et al., "LDP Specification", Network Working Group; RFC 5036; Oct. 2007; 135 pages.

Awduche, D., et al., ""RSVP-TE: Extensions to RSVP for LSP Tunnels,"", Network Working Group; RFC 3209; Dec. 2001; 61 pages.

Babiarz, J., et al., "Configuration Guidelines for DiffServ Service Classes", Network Working Group; RFC 4594; Aug. 2006; 57 pages.

Baker, F., et al., "A Differentiated Services Code Point (DSCP) for Capacity-Admitted Traffic", Internet Engineering Task Force (IETF); RFC 5865; May 2010; 14 pages.

Baker, F., et al., "Management Information Base for the Differentiated Services Architecture", Network Working Group, Request for Comment: 3289, May 2002, 116 pages.

Berger, L., "Generalized Multi-Protocol Label Switching (GMPLS) Signaling Resource ReserVation Protocol-Traffic Engineering (RSVP-TE)", Network Working Group; RFC 3473; Jan. 2003; 42 pages.

Bernet, Y., et al., "An Informal Management Model for Diffsery Routers", Network Working Group; RFC 3290; May 2002; 56 pages.

Black, D., "Differentiated Services and Tunnels", Network Working Group; RFC 2983; Oct. 2000; 14 pages.

Black, D., et al., "Per Hop Behavior Identification Codes", Network Working Group; RFC 3140; Jun. 2001; 8 pages.

Blake, S., et al., "An Architecture for Differentiated Services", Network Working Group; RFC 2475; Dec. 1998; 36 pages.

Borman, D., et al., "IPv6 Jumbograms", Network Working Group, Request for Comments: 2675, Aug. 1999, 9 pages.

Braden, et al., "Resource ReSerVation Protocol (RSVP)—Version 1 Functional Specification", Network Working Group, Request for Comments: 2205, (Sep. 1997), 112 pages.

Chan, K., et al., "Differentiated Services Quality of Service Policy Information Base", Network Working Group; RFC 3317; Mar. 2003; 96 pages.

Charny, A., et al., "Supplemental Information for the New Definition of the EF PHB (Expedited Forwarding Per-Hop Behavior)", Network Working Group; RFC 3247; Mar. 2002; 23 pages.

Coltun, R., et al., "OSPF for IPv6", Network Working Group, Request for Comment: 5340, Jul. 2008, 94 pages.

Davie, B., et al., "An Expedited Forwarding PHB (Per-Hop Behavior)", Network Working Group, Request for Comments: 3246, The Internet Society, (Mar. 2002), 16 pages.

Deering, S., et al., "Internet Protocol, Version 6 (IPv6) Specification", Network Working Group, Request for Comments: 2460, Dec. 1998, 39 pages.

Eggert, L., et al., "Unicast UDP Usage guidelines for Application Designers", Network Working Group; RFC 5405; Nov. 2008; 27 pages.

Fenner, B., et al., "Management Information Base for the User Datagram Protocol (UDP)", Network Working Group; RFC 4113; Jun. 2005; 19 pages.

Grossman, D., "New Terminology and Clarifications for Diffserv", Network Working Group; RFC 3260; Apr. 2002; 10 pages.

Heinanen, J., et al., "Assured Forwarding PHB Group", Network Working Group; RFC 2597; Jun. 1999; 11 pages.

Hendrick, C., "Routing Information Protocol", Network Working Group, Request for Comment;1058, Jun. 1988, 33 pages.

Hopps, C., "Analysis of an Equal-Cost Multi-Path Algorithm", Network Working Group, Request for Comments: 2992, The Internet Society, (Nov. 2000), 8 pages.

Housley, R., et al., "Using Advanced Encryption Standard (AES) CCM Mode with IPsec Encapsulating Security Payload (ESP)", Network Working Group; RFC 4309; Dec. 2005; 13 pages.

Information Sciences Institute, University of Southern C., "Transmission control protocol darpa internet program protocol specification", Sep. 1981, Request for Comments: 793, 91 pages.

Kent, S., et al., "Security Architecture for the Internet Protocol", Network Working Group; RFC 4301. Dec. 2005; 101 pages.

Kompella, K., et al., "Procedures for Modifying the Resource reSerVation Protocol (RSVP)", Network Working Group; RFC 3936; Oct. 2004; 7 pages.

Malkin, G., et al., "RIP Version 2", Network Working Group: RFC 2453: Nov. 1998; 39 pages.

Malkin, G., et al., "RIPng for IPv6", Network Working Group; RFC 2080; Jan. 1997; 19 pages.

Moy, J., "OSPF Version 2", Network Working Group, Request for Comments: 2328, Apr. 1998, 244 pages.

Nichols, K., et al., "Definition of Differentiated Services Per Domain Behaviors and Rules for their Specification," Apr. 2001, 24 pages, Network Working Group, Request for Comments: 3086, The Internet Society.

(56) References Cited

OTHER PUBLICATIONS

Nichols, K., et al., "Definition of the Differentiated Services Field (DS Field) in the IPv4 and IPv6 Headers", *Network Working Group;* RFC 2474; Dec. 1998; 20 pages.

Oran, David, "OSI ISIS Intradomain Routing Protocol", *Network Working Group,* Request for Comments: 1142, (Feb. 1990), 157 pages.

Polk, J., et al., "A Resource Reservation Protocol (RSVP) Extension for the Reduction of Bandwidth of a Reservation Flow", *Network Working Group;* RFC 4495; May 2006; 21 pages.

Postel, J., ""User Datagram Protocol",", Aug. 28, 1980, 3 pages, RFC 768.

Rekhter, Y., et al., "A Border Gateway Protocol 4 (BGP-4)", *Network Working Group;* RFC 4271; Jan. 2006; 104 pages.

Rosen, E., et al., "BGP/MPLS IP Virtual Private Networks (VPNs)", *Network Working Group,* Request for Comment: 4364, Feb. 2006, 47 pages.

Shenker, et al., "Specification of Guaranteed Quality of Service", *Network Working Group,* Request for Comments: 2212, (Sep. 1997), 20 pages.

Socolofsky, T., et al., "A TCP/IP Tutorial", *Network Working Group;* RFC 1180; Jan. 1991; 28 pages.

Thaler, et al., "Multipath Issues in Unicast and Multicast Next-Hop Selection", *Network Working Group,* Request for Comments: 2991, *The Internet Society,* (Nov. 2000), 9 pages.

Wroclawski, J., "Specification of the Controlled-Load Network Element Service", *Network Working Group;* RFC 2211; Sep. 1997; 19 pages.

Wroclawski, J., "The Use of RSVP with IETF Integrated Services", *Network Working Group;* RFC 2210; Sep. 1997; 33 pages.

*OpenFlow 1.1* http://www.openflow.org/wk/index.php/OpenFlow_v1.1; 7 pages.

Joseph, D. A., et al., "A policy aware switching layer for data centers", *Proc. ACM SIGCOMM,* pp. 51-62; 2008.

McKeown, N., et al., "Openflow: enabling innovation in campus networks", *SIGCOMM;* Mar. 14 2008. 6 pages.

* cited by examiner

AT CONTROLLER

AT SWITCH

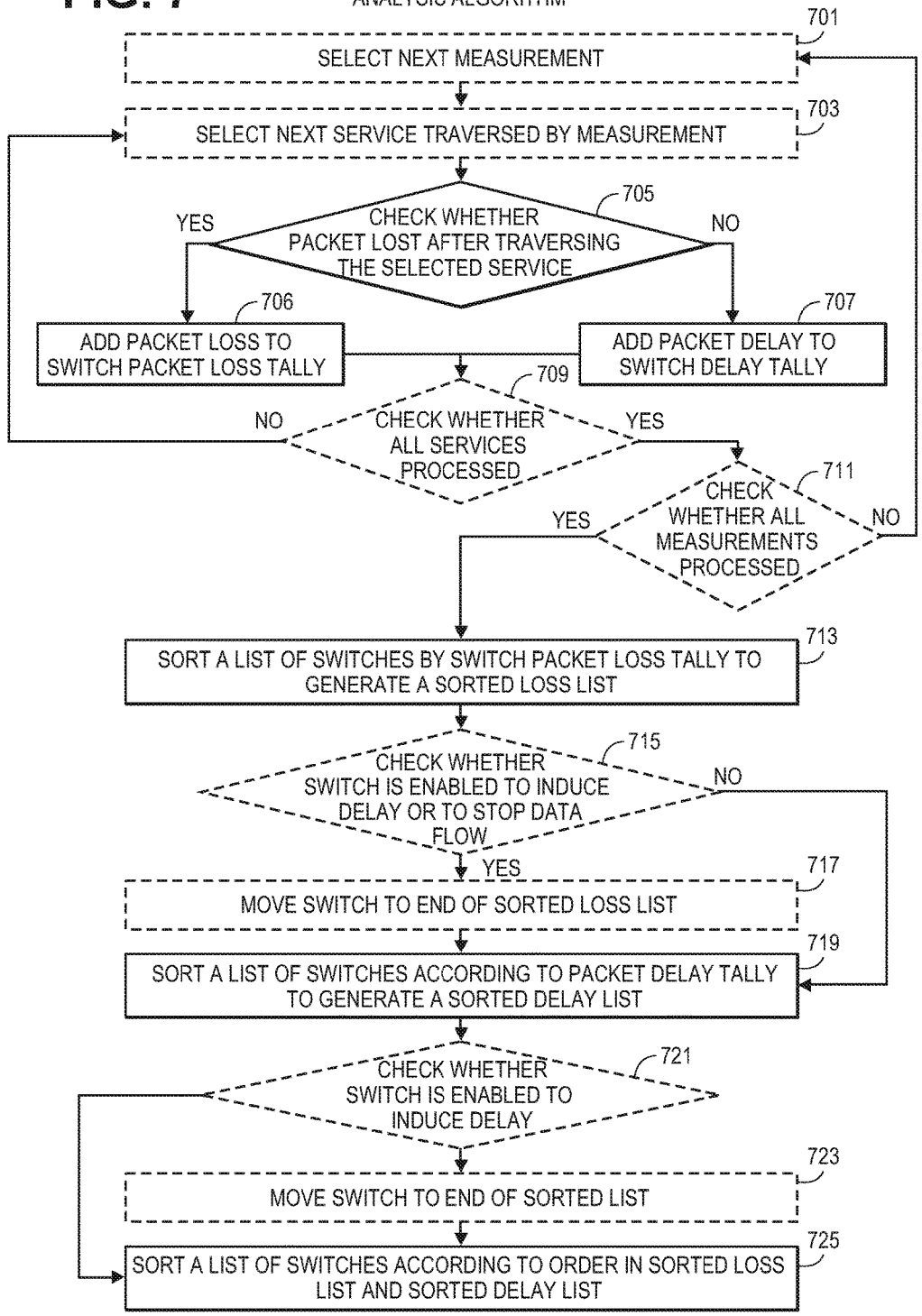

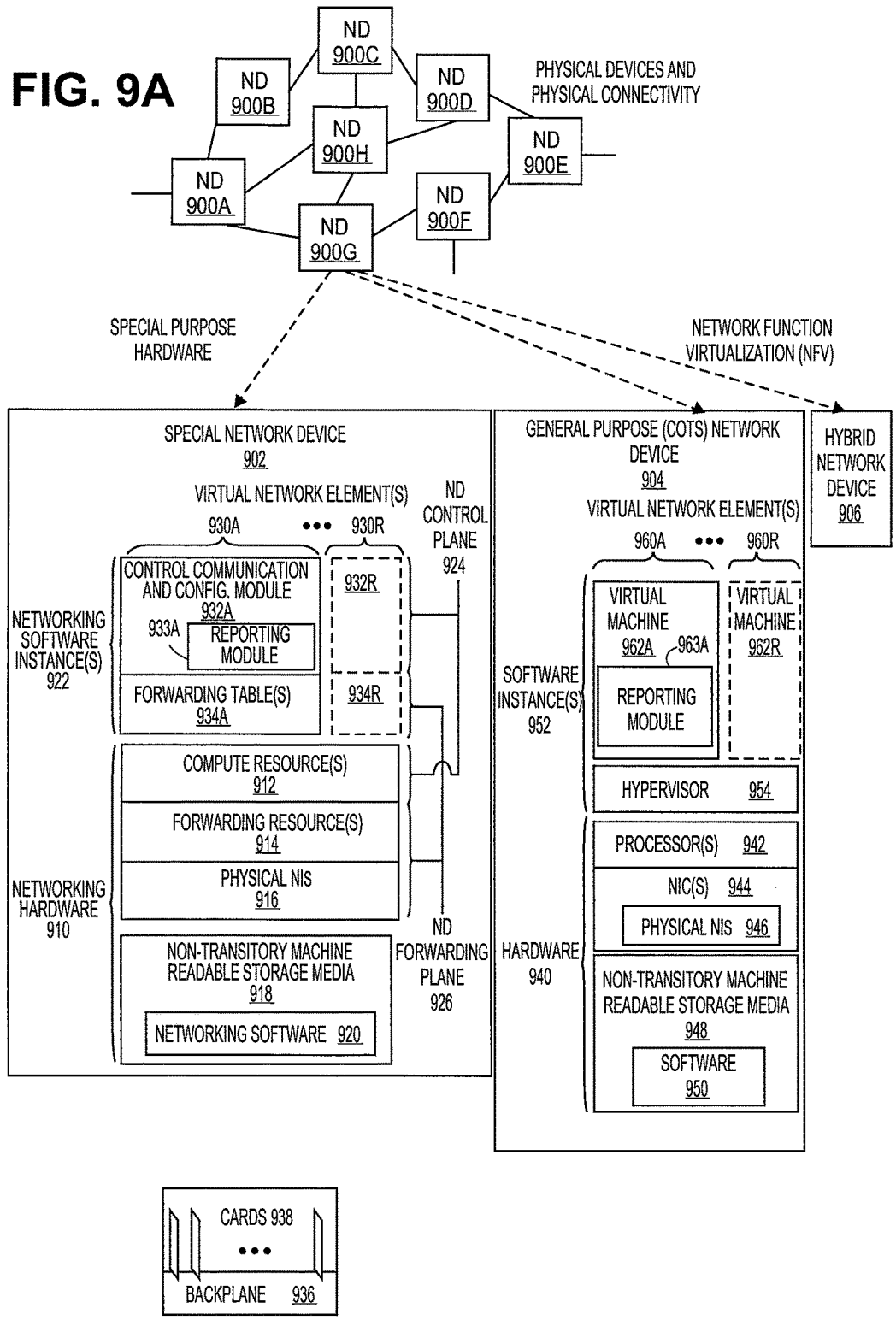

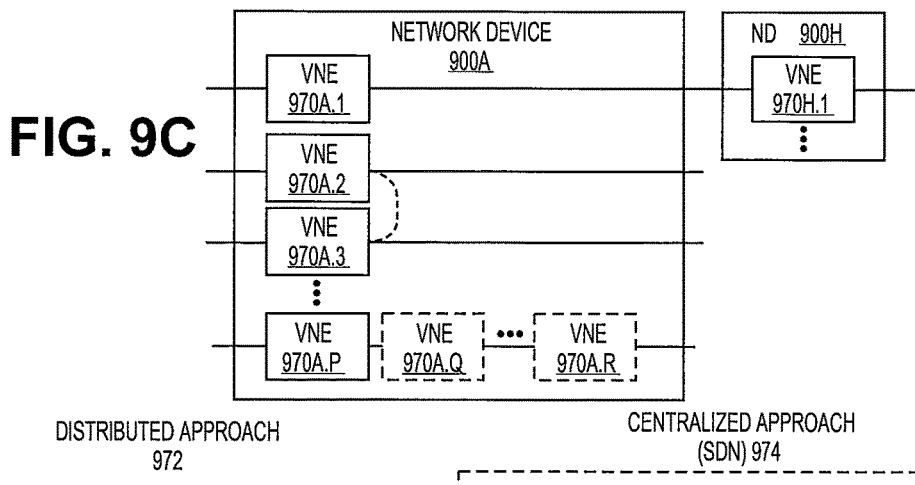
FIG. 9C
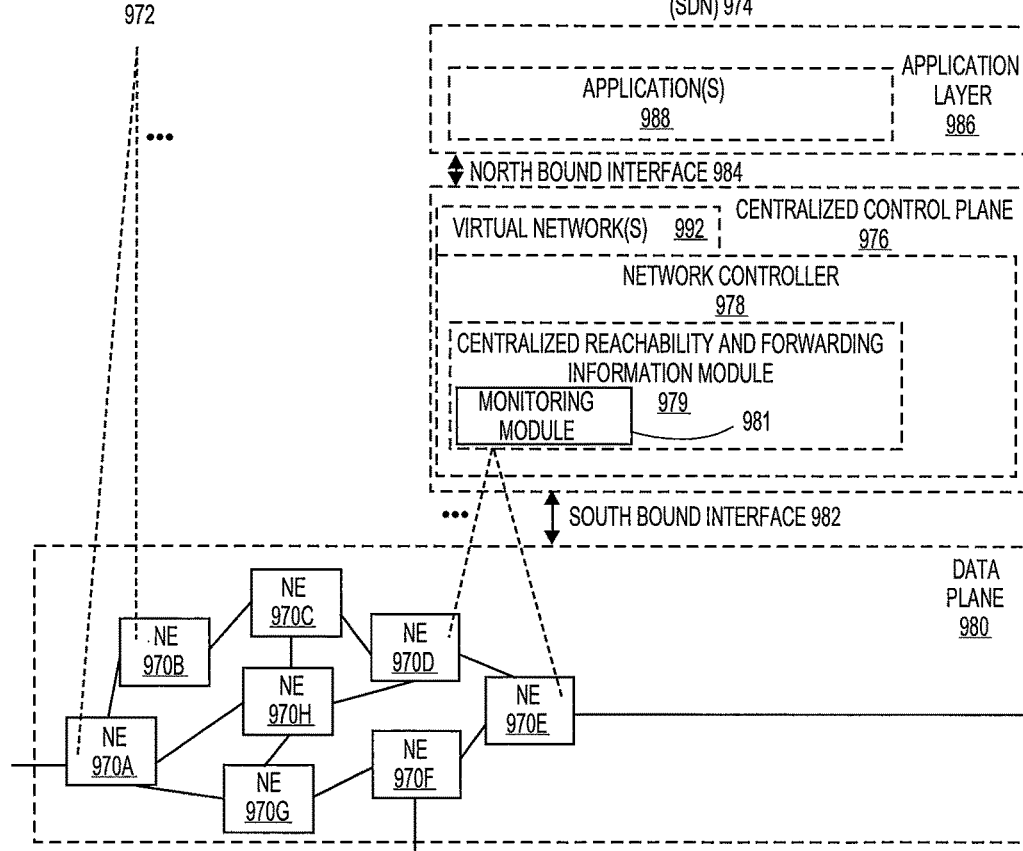
FIG. 9D
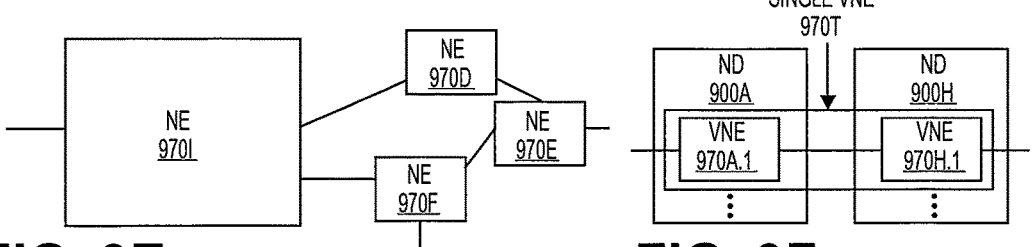
FIG. 9E
FIG. 9F

PASSIVE PERFORMANCE MEASUREMENT FOR INLINE SERVICE CHAINING

CROSS-REFERENCE TO RELATED APPLICATION

Cross-reference is made to U.S. application Ser. No. 14/549,373, by Ying Zhang, et al. for "PASSIVE PERFORMANCE MEASUREMENT FOR INLINE SERVICE CHAINING", filed Nov. 20, 2014 and commonly owned. The cross-referenced application is incorporated herein by reference.

FIELD

Embodiments of the invention relate to the field of inline service chaining performance monitoring. Specifically, the embodiments relate to a method and system for monitoring performance of an inline service chain in a Software defined Networks (SDN).

BACKGROUND

Network operators use different computing devices in their networks, referred to as middleboxes, to provide various services related to data traffic and subscriber management. These services are called inline services. Examples of theses serviced include deep packet inspection (DPI), logging/metering/charging/advanced charging, firewall, intrusion detection and prevention (IDP), network address translation (NAT), and similar services to manage the data traffic from subscribers of the network operator. These services have high requirements on throughput and packet inspection capabilities. The services can be transparent or nontransparent to the end users. Inline services can be hosted in middleboxes in dedicated physical hardware, or in virtual machines.

Service chaining is a process of establishing a sequence of services to process a data flow. Service chaining is required if the data traffic needs to go through more than one inline service. Moreover, if more than one chain of services is possible, then the network operator needs to configure the networking infrastructure to direct the data traffic through the path of the right inline service chain. As used herein, data traffic steering refers to guiding the data traffic through the right inline service path.

There are several mechanisms that have been developed to manage how to steer data traffic to provide inline service chaining. These mechanisms are designed to explicitly insert the inline services on the path between end-points for a given data flow, or explicitly route traffic through different middleboxes according to the policies associated with that data flow. However, no matter what schemes are used to steer traffic in the network, there exists a problem of how to test the performance of any given service path. For example, it is desirable to understand the delay and loss rate of a data flow that traverses a set of services A, B, and C. This is called performance measurement for inline service chaining.

Although there are many operations administration and management (OAM) tools to measure reachability in general settings, the inline services chaining imposes new challenges. The key challenge is that these OAM methods actively inject packets to the network to test the wellness of a network path. If packets are injected actively to the service path, the packets will be forwarded to the middleboxes. The middleboxes may not know how to handle these injected packets, and thus, the middleboxes may drop the unknown packets. Or the probing packets may confuse the internal states of the middleboxes.

SUMMARY

A method is implemented by a network device to monitor the performance of packet processing in an in-line service chain, the network device one of a plurality of network devices forming a software defined network (SDN) and the in-line service chain. The SDN includes a controller to configure the plurality of network devices. The method includes receiving a sequence of packets of a data flow traversing the in-line service chain, applying a hash function to the sequence of packets of the data flow to generate a set of hash values for the sequence of packets, and sending the set of hash values and a set of timestamps for the sequence of packets to the controller to determine delay and loss across a service of the in-line service chain.

A method implemented by a computing device to monitor the performance of packet processing in an in-line service chain. The computing device is in communication with a plurality of network devices forming a software defined network (SDN) and the in-line service chain. The SDN includes a controller implemented by the computing device to configure the plurality of network devices. The plurality of devices include a first switch and a second switch positioned across a service in the in-line service chain traversed by a packets of a data flow. The first switch generates a first set of hash values and a first set of timestamps for the packets. The second switch generates a second set of hash values and a second set of timestamps for the packets. The method includes receiving the first set of hash values and the first set of timestamps from the first switch and the second set of hash values and the second set of timestamps from the second switch, comparing a timestamp of the first set of time stamps with a second timestamp of the second set of timestamps having a same hash value to determine a delay time, identifying packet loss where a matching hash value for a hash value from the first set of hash values is not found in the second set of hash values, and sending timestamp table reset commands to first switch and second switch.

A network device monitors the performance of packet processing in an in-line service chain. The network device is one of a plurality of network devices forming a software defined network (SDN) and the in-line service chain. The SDN includes a controller to configure the plurality of network devices. The network device includes a non-transitory machine-readable medium having stored therein a monitoring module, and a network processor configured to execute the reporting module. The reporting module is configured to receive a sequence of packets of a data flow traversing the in-line service chain, apply a hash function to the sequence of packets of the data flow to generate a set of hash values for the sequence of packets, and send the set of hash values and a set of timestamps for the sequence of packets to the controller to determine delay and loss across a service of the in-line service chain.

A control plane device monitors the performance of packet processing in an in-line service chain. The control plane device is in communication with a plurality of network devices forming a software defined network (SDN) and the in-line service chain. The SDN includes a controller implemented by the control plane device to configure the plurality of network devices. The plurality of devices include a first switch and a second switch positioned across a service in the in-line service chain traversed by a packets of a data flow. The first switch generates a first set of hash values and a first set of timestamps for the packets. The second switch generates a second set of hash values and a second set of timestamps for the packets. The control plane device comprises a non-transitory machine-readable medium having stored therein a monitor module, and a processor is configured to execute the monitor module. The monitor module is configured to receive the first set of hash values and the first set of timestamps from the first switch and the second set of hash values and the second set of timestamps from the second switch, to compare a timestamp of the first set of time stamps with a second timestamp of the second set of timestamps having a same hash value to determine a delay time, to identify packet loss where a matching hash value for a hash value from the first set of hash values is not found in the second set of hash values, and to send timestamp table reset commands to first switch and second switch.

A computing device implements a plurality of virtual machines for implementing network function virtualization (NFV), wherein a virtual machine from the plurality of virtual machines is configured to execute a method to monitor the performance of packet processing in an in-line service chain. The network device is one of a plurality of network devices forming a software defined network (SDN) and the in-line service chain. The SDN includes a controller to configure the plurality of network devices. The computing device includes a non-transitory machine-readable medium having stored therein a monitoring module, and a processor configured to execute the virtual machine. The virtual machine implements the reporting module. The reporting module is configured to receive a sequence of packets of a data flow traversing the in-line service chain, apply a hash function to the sequence of packets of the data flow to generate a set of hash values for the sequence of packets, and send the set of hash values and a set of timestamps for the sequence of packets to the controller to determine delay and loss across a service of the in-line service chain.

A computing device implements a plurality of virtual machines for implementing network function virtualization (NFV), wherein a virtual machine from the plurality of virtual machines is configured to execute a method to monitor the performance of packet processing in an in-line service chain. The computing device is in communication with a plurality of network devices forming a software defined network (SDN) and the in-line service chain. The SDN includes a controller implemented by the computing device to configure the plurality of network devices. The plurality of devices includes a first switch and a second switch positioned across a service in the in-line service chain traversed by a packets of a data flow. The first switch generates a first set of hash values and a first set of timestamps for the packets. The second switch generates a second set of hash values and a second set of timestamps for the packets. The computing device includes a non-transient machine-readable medium having stored therein a monitor module, and a processor configured to execute the virtual machine. The virtual machine implements the monitor module. The monitor module is configured to receive the first set of hash values and the first set of timestamps from the first switch and the second set of hash values and the second set of timestamps from the second switch, to compare a timestamp of the first set of time stamps with a second timestamp of the second set of timestamps having a same hash value to determine a delay time, to identify packet loss where a matching hash value for a hash value from the first set of hash values is not found in the second set of hash values, and to send timestamp table reset commands to first switch and second switch.

BRIEF DESCRIPTION OF THE DRAWINGS

The invention may best be understood by referring to the following description and accompanying drawings that are used to illustrate embodiments of the invention. In the drawings:

FIG. 7 is a flowchart of one embodiment of a process for diagnosing network delay and loss problems.

9A illustrates connectivity between network devices (NDs) within an exemplary network, as well as three exemplary implementations of the NDs, according to some embodiments of the invention.

FIG. 9B illustrates an exemplary way to implement the special-purpose network device 902 according to some embodiments of the invention.

FIG. 9C illustrates various exemplary ways in which virtual network elements (VNEs) may be coupled according to some embodiments of the invention.

FIG. 9D illustrates a network with a single network element (NE) on each of the NDs of FIG. 9A, and within this straight forward approach contrasts a traditional distributed approach (commonly used by traditional routers) with a centralized approach for maintaining reachability and forwarding information (also called network control), according to some embodiments of the invention.

FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention.

Figure 10:
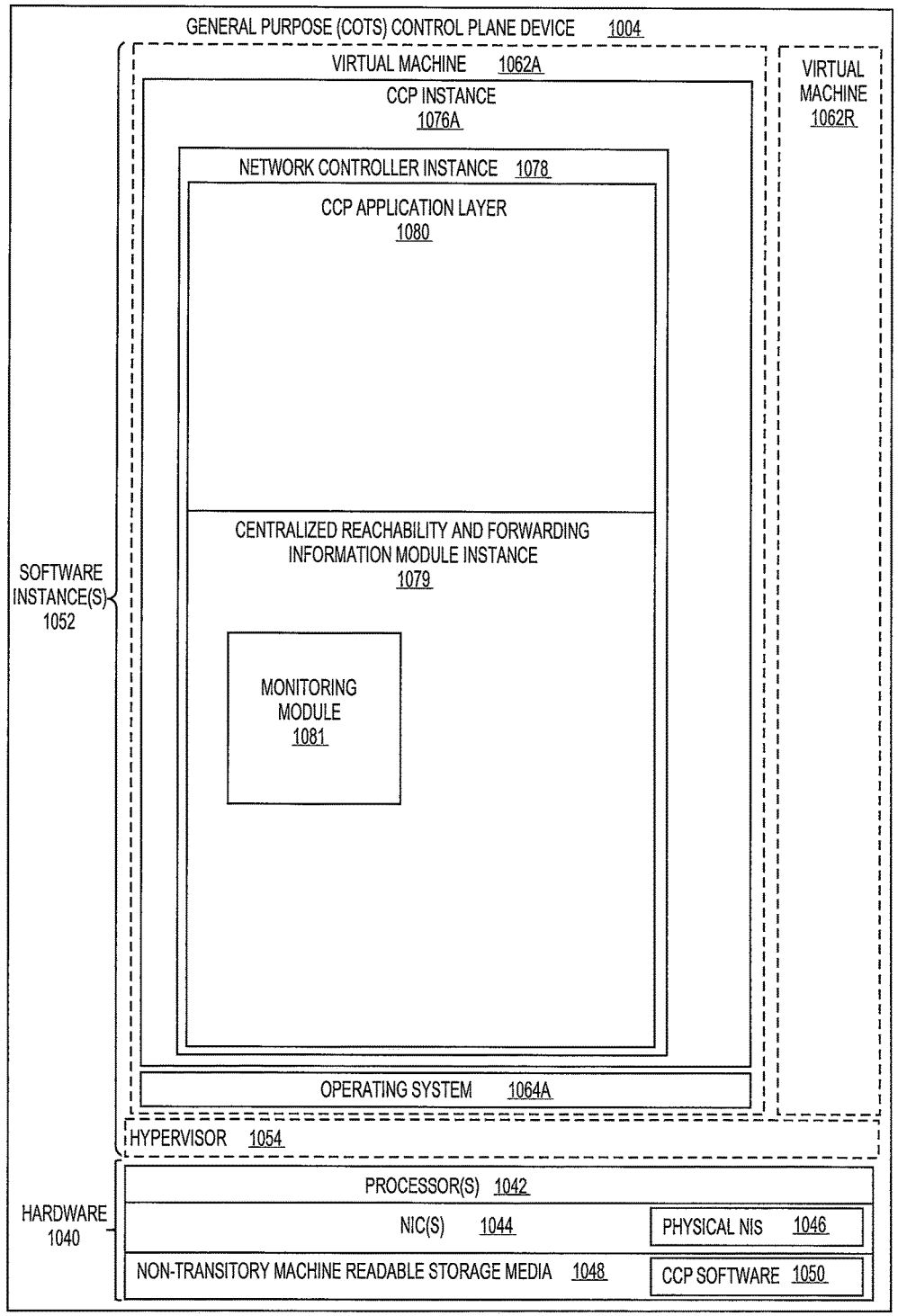

FIG. 10 illustrates a general purpose control plane device 1004 including hardware 1040 comprising a set of one or more processor(s) 1042 (which are often Commercial off-the-shelf (COTS) processors) and network interface controller(s) 1044 (NICs; also known as network interface cards) (which include physical NIs 1046), as well as non-transitory machine readable storage media 1048 having stored therein centralized control plane (CCP) software 1050), according to some embodiments of the invention.

DESCRIPTION OF EMBODIMENTS

The following description describes methods and apparatus for measuring performance in an inline service chain including delay and loss where the service chain is in a software defined network (SDN). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Overview

In the embodiments of the invention, a passive measurement approach is utilized by installing rules on the relevant switches' forwarding tables, the switches collect digests of the packet and the timestamps at which they are captured. The summary of the results are sent to the controller. By correlating the packets received from different switches of the network, the controller can compute the delay and loss of a given data flow in particular as these data flows traverse the services in inline service chains. However, the services may modify the packets on the fly. Thus, embodiments provide a method that identifies the invariant bits of packets in the data flows across multiple services, according to a model of the service. The embodiments construct the hash function based on the invariant bits. Finally, to differentiate performance issues from the expected behavior of the service, embodiments provide a process to identify a root cause of problems in the network based on the measurement results and the model specification of the services.

Inline Service Chaining

As set forth above, network operators need processes and tools to perform flexible traffic steering. Service chaining is required if the data traffic needs to go through more than one inline service. Moreover, if more than one chain of services is possible, then the network operator needs to be able to configure the networking infrastructure to direct the right traffic through the right inline service path.

The requirements for any solutions are efficiency, flexibility, scalability and openness. With regard to efficiency, data traffic should traverse middleboxes in the sequence specified by the network operators and should not unnecessarily traverse middleboxes. Great capital expenditure savings could be achieved if data traffic could be selectively steered through or steered away (bypassed) from specific services. With regard to flexibility, the framework of any solution should support subscriber, application, and operator specific policies simultaneously, all stemming from a single control point. Adding or removing new services should be easily done by the network operator. With regard to scalability, the framework should support a large number of rules and scale as the number of subscribers/applications grows. The ability to offer a per-subscriber selection of inline services could potentially lead to the creation of new offerings and hence new ways for operators to monetize their networks. With regard to openness, the should be possible to deploy to measure performance across any type of middlebox in the network, independently of its vendor in order to avoid vendor lock-in. Further, network operators should be able to leverage their current investment by reusing their existing middleboxes without modifications.

The embodiments of the current invention meet these requirements as set forth herein below. In general, network operators use policy-based routing (PBR) to forward the subscriber traffic towards the right services. The network operators may also use access control lists (ACLs) and virtual local area networks (VLANs) (or other tunneling techniques) to forward the data packets to the right services and middleboxes.

In some cases, service chaining can be partly performed by the services themselves, leaving less control to the network operator over the remaining hops in a service path. In this case, the services must be configured to direct traffic to the next hop in the inline service chain if the service middlebox is not directly connected to the next hop.

Figure 1:
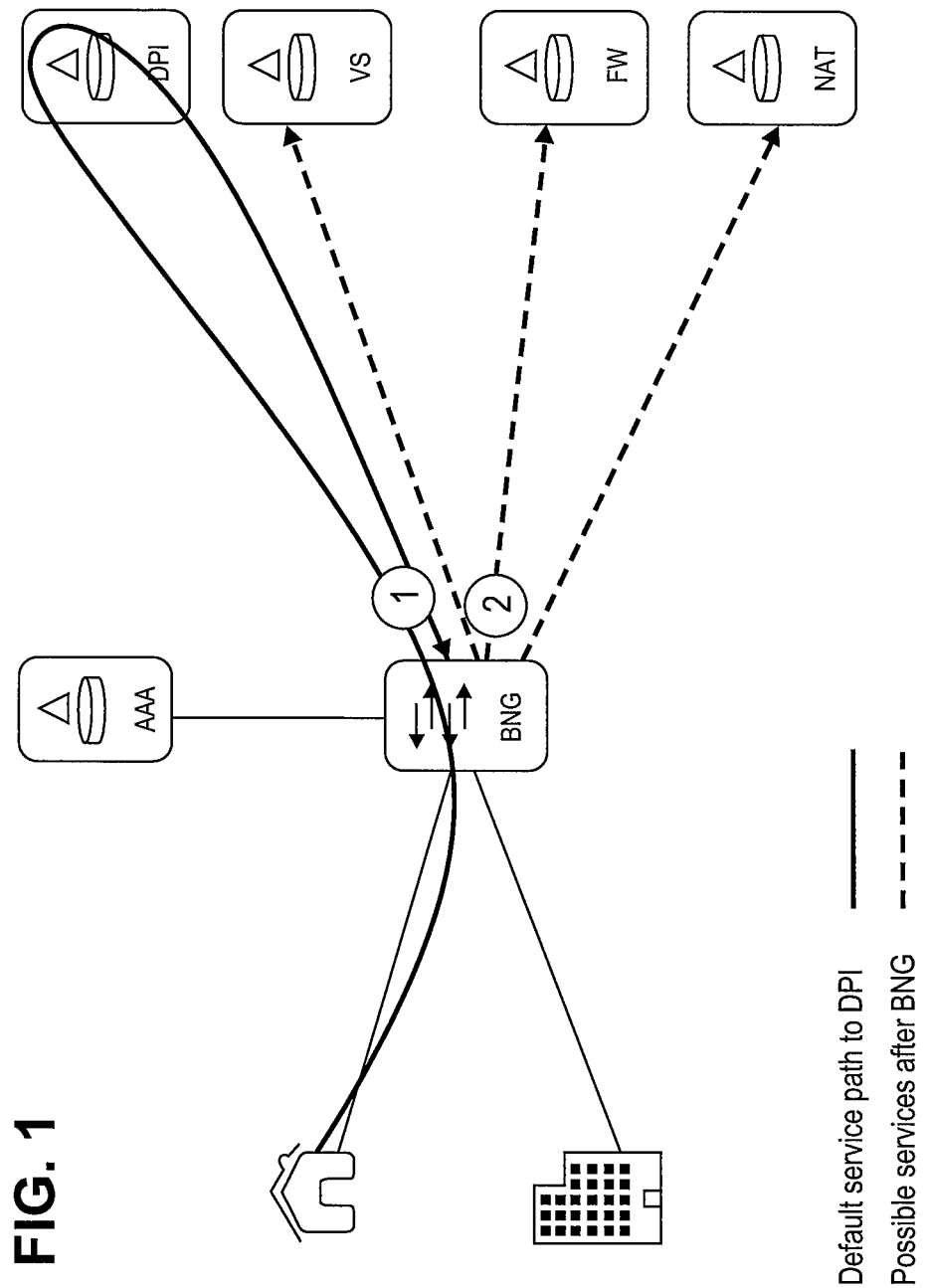
FIG. 1 is a diagram of one embodiment of a service chain in a standard network configuration.

FIG. 1 is a diagram depicting the prior art problems that the embodiments solve. In this example, it is assumed that residential traffic will need DPI and NAT. In this example, premium residential data traffic will get the same services as basic residential data traffic in addition to firewall and uniform resource locator (URL) filtering (URL filtering not shown). And finally enterprise traffic will not require NAT but will need firewall and virus scanning. In this example, all data traffic goes through the DPI and returns to the border network gateway (BNG), point (1) in the figure. From there (point 2 in the figure) the BNG has to direct the traffic to the correct next hop service. The subscriber session is handled by an authentication, authorization, and accounting (AAA)-driven policy that can define the first hop service in a service chain; however, this subscriber context information is no longer associated with the return traffic from the DPI at point (1). Hence, determining the next service for a specific flow becomes non-trivial.

Further in the prior art, there are several other methods or systems for handling service chaining One method is the use of a single box running multiple services: This approach consolidates all inline services into a single box and hence avoids the need for dealing with inline service chaining configuration across multiple middleboxes. In this approach, the network operator adds new services by adding additional service cards to its router or gateway.

However, this approach cannot satisfy the openness requirement as it is hard to integrate existing third party service appliances. This solution also suffers from a scalability issue as the number of services and the aggregated bandwidth is limited by the router's capacity. The number of slots in chassis is also limited.

Another approach in the prior art is the use of statically configured service chains. This approach is to configure one or more static service chains where each service is configured to send traffic to the next service in its chain. A router classifies incoming data traffic and forwards it to services at the head of each chain based on the result of the classification. However, this approach does not support the definition of policies in a centralized manner and instead requires that each service be configured to classify and steer traffic to the appropriate next service. This approach requires a large amount of service specific configuration and is error prone. It lacks flexibility as it does not support the steering of traffic on a per subscriber basis and limits the different service chains that can be configured. Getting around these limitations would require additional configuration on each service to classify and steer traffic.

A further approach is policy based routing, with regard to this approach each service must be configured to return data traffic back to the router after processing it. The router classifies traffic after each service hop and forwards it to the appropriate service based on the result of the classification. However, this approach suffers from scalability issues as traffic is forced through the router after every service. The router must be able to handle N times the incoming data traffic line rate to support a service chain with N−1 services.

Policy-aware switching layer is an approach where a policy-aware switching layer for data centers which explicitly forwards traffic through different sequences of middleboxes. This method satisfies the efficiency requirement but fails to meet the requirements of flexibility and scalability. Each policy needs to be translated into a set of low level forwarding rules on all the relevant switches. There is no explicit way to configure application related and subscriber related rules separately. They need to be manually consolidated into a set of low level rules. Moreover, it requires installing one rule for each new flow. Therefore, it is hard to scale with the number of subscriber/application combinations.

SDN Based Inline Service Chaining

Software Defined Networking (SDN) is a recent network architecture where the control plane is decoupled from the forwarding plane (i.e., the data plane) and the entire router is built as a distributed system. An SDN contains a network-wide control platform, running on one or more servers in the network, overseeing a set of simple switches. Traditional router architecture follows an integrated design where the control plane and data forwarding engine are tightly coupled in the same box, which usually results in overly complicated control plane and complex network management. Due to high complexity, equipment vendors and network operators are reluctant to employ changes and the network itself is fragile and hard to manage. This is known to create a large burden and high barrier to the new protocols and technology developments.

The SDN network comprises multiple forwarding elements, i.e., network devices operating as switches interconnecting with each other and a small number of computing devices implementing controllers that instruct the switches' forwarding behavior.

The main task of a forwarding element, or a switch, is to forward packets from ingress port to an egress port, according to the rules in a flow table programmed by the remote controller. The flow table contains a set of flow entries. Each flow entry contains a set of actions such as forwarding packets to a given port, modifying certain bits in the packet header, or encapsulating packets to the controller, or simply dropping the packets. For the first packet in a new data flow, the switch normally forwards the packet to the controller to trigger the new flow entry being programmed. It can also be used to forward all slow-path packets to a controller for processing such as Internet control message protocol (ICMP) packets. The concept of a flow can be defined broadly, e.g., a transmission control protocol (TCP) connection, or all traffic from a particular media access control (MAC) address or an Internet Protocol (IP) address.

The centralized SDN controller adds and removes flow entries from the flow tables of the switches in the forwarding or data plane of the SDN. The controller defines the interconnection and routing among the set of data plane switches. It also handles network state distribution, such as collecting information from the switches and distributing routing instructions to them. The controller can also be programmed to support any new addressing, routing, and complex packet processing applications. The controller is the "brain" of the network. A switch needs to connect to at least one controller to function correctly. A simple network topology that consists of two controllers and a set of switches.

Figure 2:
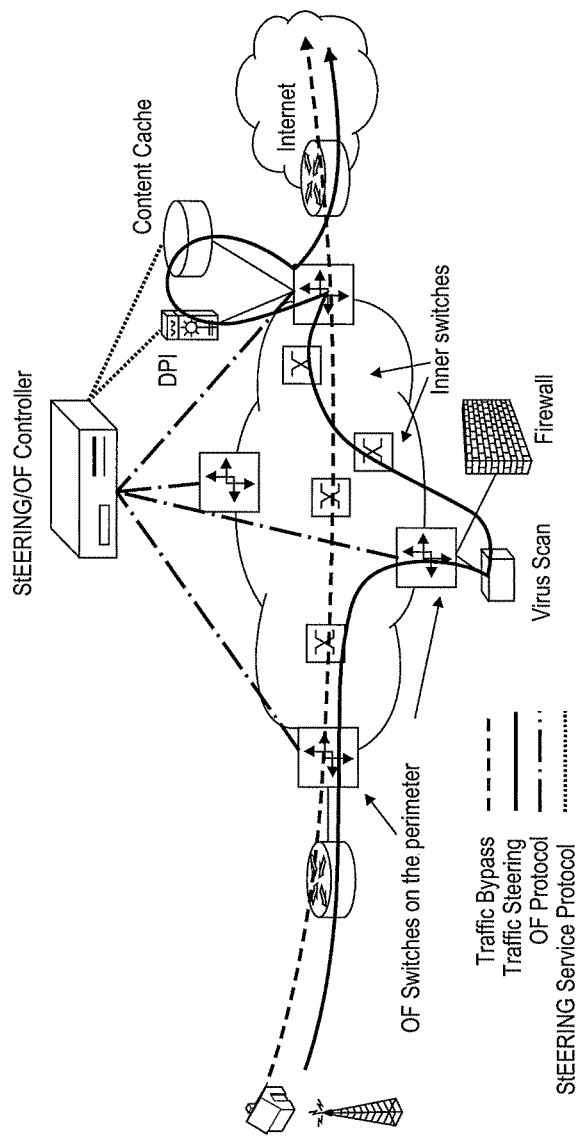
FIG. 2 is a diagram of one embodiment of a service chain in a software defined network.

An example of an SDN is provided in FIG. 2. In this example, when switch S4 receives a new flow without knowing where to send the packet, forwards the first received packet of the newly received data flow to the controller. Upon receiving the packet, the controller programs a new routing entry on.

SDN Based Inline Service Chaining

FIG. 2 also provides an example architecture for inline service chaining using an SDN. This example uses a logically centralized controller to manage switches and middleboxes. The solid line and the dotted line in FIG. 2 show two different service paths that traverse the SDN. In this example, service paths are set based on the subscriber, the application, and the required service order. Service paths are unidirectional, that is, different service paths are specified for upstream and downstream traffic. The solid line in this figure shows a service path for the upstream traffic through Virus Scan, DPI and Content Cache. The dashed line shows a service path that bypasses all the services of the SDN.

This example architecture uses two different types of switches. Perimeter switches are placed on the perimeter of the service delivery network. These switches will classify the incoming traffic and steer it towards the next service in the chain. These are the switches to which services or gateway nodes are connected. The inner switches will forward the traffic through the network. These switches are only connected to other switches. These switches may or may not be controlled by the central controller.

Traffic steering is a two-step process. The first step classifies incoming packets and assigns them a service path based on predefined subscriber, application, and ordering policies. The second step forwards packets to a next service based on its current position along its assigned service path. This two-step traffic steering process only needs to be performed once between any two border routers (i.e., perimeter switches), regardless of the number of inner switches that connects them.

Service Chaining OAM

Regardless of what mechanism is used to implement the service chaining, one important problem is how to verify that the path has been correctly installed. The goal is to prove that packets of a given flow have traversed the expected path. Existing reachability measurement processes include ping and traceroute to measure the reachability from a source to a destination. Ping triggers ICMP replies and traceroute triggers ICMP time-to-live (TTL) expiration messages on the routers along the path. Both methods do not require two-end control. These functions, ping and traceroute, have been implemented or are available at different protocol layers, e.g. multi-protocol label switching (MPLS) ping.

However, as started earlier, the traditional ping/traceroute method is not suitable for the inline service setting. In traditional networks, the loss of ping/traceroute packets indicated the path problem. However, in example context, the ping/traceroute packet may not be recongnized by the service (middlebox) in the middle of the path, and thus may be dropped. Similarly, the service may introduce additional delay to the packet. Thus, we cannot simply say the symptom of lost measurement packets is due to the path performance problem. Therefore, we need a different method to measure the path performance for inline service chaining.

Measurement

In the embodiments of the invention, a new method to measure the loss and delay of an inline service chain is provided. Instead of actively injecting packets to the network, this method records the timestamps when packets are seen at each switch, and then forwards the compact representation of this information to the controller. By correlating the packets captured by different switches, the controller can compute the difference of timestamps to compute the delay, and use the difference of number of packets to represent the loss. This process involves a series of steps.

First, the controller has the knowledge of a sequence of middleboxes each data flow needs to traverse. The controller has the topology of the network and the services, and the constructed service chains for each flow. The controller receives requests to measure the path for a specific data flow, then it installs rules on all the relevant switches that are traversed by that data flow. The rules match on the fields of the packet headers of the flow and the input port, create a copy, and send it to the controller. The fields of the flow can identify the packets of the data flow, and the input port indicates which service the packets have traversed.

Second, for each data flow, the process samples a few time windows. In each time window, each of the switches at both ends of the path will be asked to record the timestamps of each packet's arrival, and maintain a counter of the total number of packets in each time window. We can compute the loss rate of each window by computing the difference of the packet counters, and the average delay by summing up the difference of timestamps of the same packets recorded at different switches.

Third, the process addresses the issue that middleboxes may modify the packets so that hashing on the packet headers may not always capture the same packet. To address this challenge, the process analyzes the types of modifications that common middleboxes may do to the packets. The process determines a model based method to identify the invariant bits and use them as the keys to construct the hashes.

Finally, some middleboxes may delay or drop packets intentionally. This will introduce confusion to the interpretation of the results. The process incorporate this into the model of the middleboxes, and then uses this information to help guide the search of most likely causes of the measurement results.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Basic Delay and Loss Measurement in SDN

The embodiments focus on a network consisting of many switches, controlled by a single centralized controller. The centralized controller gathers timing information from all the switches and—in real time—calculates delay between any pair of switches for a given path segment. The embodiments measure the delay experienced by 'actual' data packets—rather than injecting some packets into the network and measuring the delay experienced by these packets.

The main idea is to record the arrival times of a number of packets at any pair of switches. Note that it can also be on the same switch for packets before and after traversing a service. If the timers on both switches are synchronized, the path delay could be calculated as the average time difference between any pair of switches. The challenge, however, is in recording arrival times of the 'same' set of packets at both ingress and egress switches. To address this issue, the embodiments (1) record arrival times of a sequence of packets (e.g., 200 packets) belonging to the desired flow at both ends of the measurement switches, (2) apply a hash function to these selected packets to encode the full packet into a fixed number of bits at any switch where the measurement is to be taken. Store the hash value along with the time stamp in the Time Stamp Table (TST) or alternatively use the hash value as an index into the table to store the time stamp, (3) send this information to the centralized controller, (4) at the controller, compare the timestamps of packets with the same hash value. The path delay is the difference between the two timestamps. Finally, (6) the process resets the time stamp tables.

When performing delay calculations, in many cases, there is some (but not complete) overlap between the selected packets at the first and second switches. The controller calculates the average path delay only based on the common subset of the two switches' time-stamp table entries. When performing loss calculations, by computing the difference of packets at the first and the second switches, the process will obtain the total number of lost packets between these two end points.

Figure 3A:
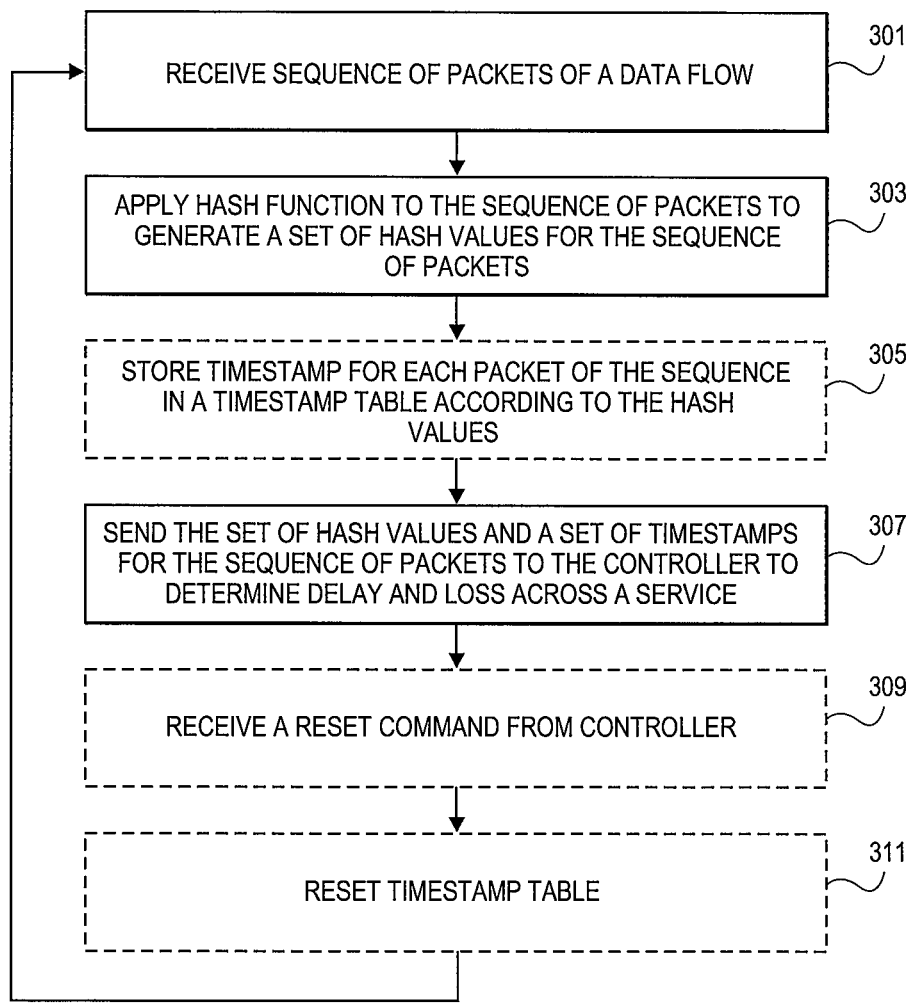
FIG. 3A is a flowchart of one embodiment of a process for measuring delay and loss at a switch.

FIG. 3A is a flowchart of one embodiment of the delay and loss measurement process as implemented at the switch. This process assumes that the controller has already configured the switch to monitor a particular data flow. As discussed further herein below, the controller can configured the flow table to identify the packets of a data flow by examination of invariable fields of the packets of the data flow. In one embodiment, the process is responsive to the receipt of data packets of the data flow being measured or monitored (Block 301). The process can be carried out on a packet by packet basis where each of the packets received for a data flow are processed as set forth herein below or where a subset of all the packets are processed as they are received.

A hash function can then be applied to each packet of the sequence or any combination or subset of the sequence of data packets (Block 303). The hash function can operate over any portion of the data packet such as specifically identified fields in the header or any set of bits including those bits that have been identified to be invariant for a particular data flow. The resulting hash value can be utilized to store a timestamp for each packet of the sequence or for groups of packets (Block 305). The timestamp can be the timestamp of the packet at the time it is received by the switch or any similar indicator of packet arrival or processing time that is consistently captured by the switch. The timestamps for the received data flow packets can integer values or similar data types having any size or format. In one embodiment, the timestamp table is indexed by the hash value and each time stamp of the received data packet is recorded in the timestamp table according to the hash value. In other embodiments, other types of storage structures can be utilized and the hash value can be used as a key or similarly stored with the associated timestamps.

With the timestamps identifying an arrival or similar time associated with each of the data packets for a data flow recorded, the process prepares and sends the set of hash values and the associated set of timestamps to the controller to enable the controller to determine delay and loss across as service when the data is compared with that of other switches on the other side of the switch (block 307). After this data has been successfully transferred and received by the controller using any communication protocol then the controller can respond with an acknowledgement and a command to reset the timestamp table (Block 309). Resetting the timestamp table clears the transmitted data to free up storage space for continued measurements of the data flow being monitored (Block 311). The process can operate continuously as additional data packets are received for the data flow. A switch can execute any number of similar processes and maintain any number of timestamp tables to monitor and measure the performance of any number of data flows.

Figure 3B:
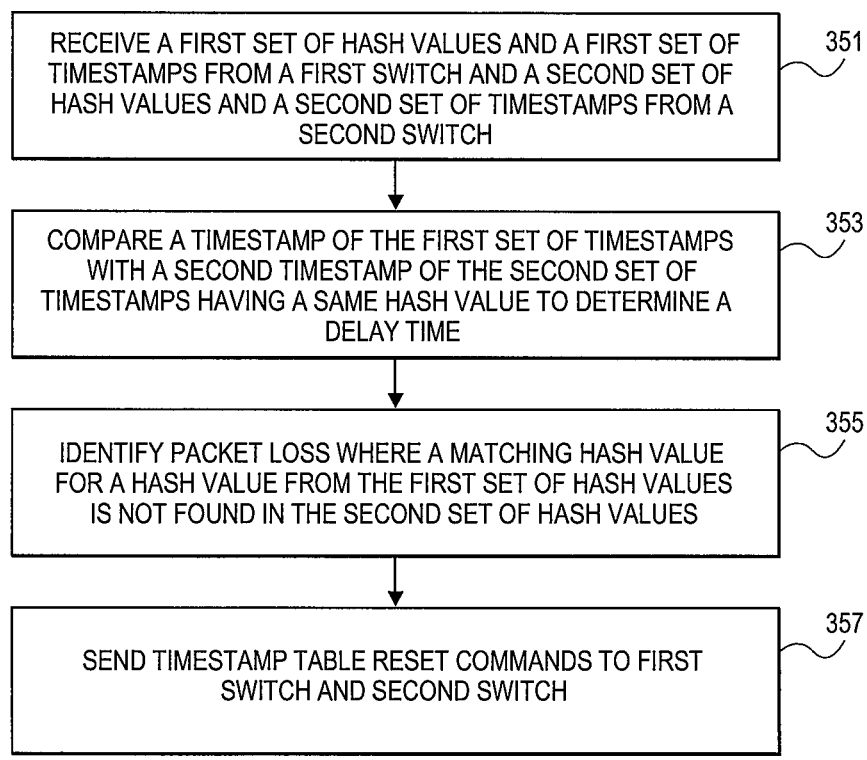
FIG. 3B is a flowchart of one embodiment of a process for measuring delay and loss at a controller.

FIG. 3B is a flowchart of one example embodiment of the measurement process implemented by the controller. The controller receives sets of hash values and timestamps from each of the configured switches in the SDN (Block 351). These hash values and corresponding timestamps can be compared between switches to determine delay and loss of packets. For example a first set of hash values and timestamps can be received from a first switch downstream from a service while a second set of hash values and timestamps are received from a second switch upstream of the service. Comparing the data from the first switch and second switch can enable detection of lost packets as well as the delay of packets correlated with this service between the two switches (Block 353).

The comparison checks whether matching hash values are found that were received from both switches. In cases where matching hash values are found then delay time can be determined by comparison of the timestamps. The difference in the timestamps provides a delay time for traversing the middlebox or services between the two switches.

Similarly, where matching hashes are not found, then packet loss can be determined by identifying those hash values that occurred at the first switch that were not found to be reported by the second switch (Block 355). In some cases the packets are modified or dropped by the middlebox or service and this modification is anticipated as described herein below. After packet delay and loss are calculated then a reset command can be sent to the switches that reported the processed hash values and timestamps. This enables the switch to free up space for the collection of additional timestamps for packets that are subsequently received by the switch in the same data flow. The reset command clears the timestamp table for those hash values that have been sent or processed by the controller.

Figure 4:
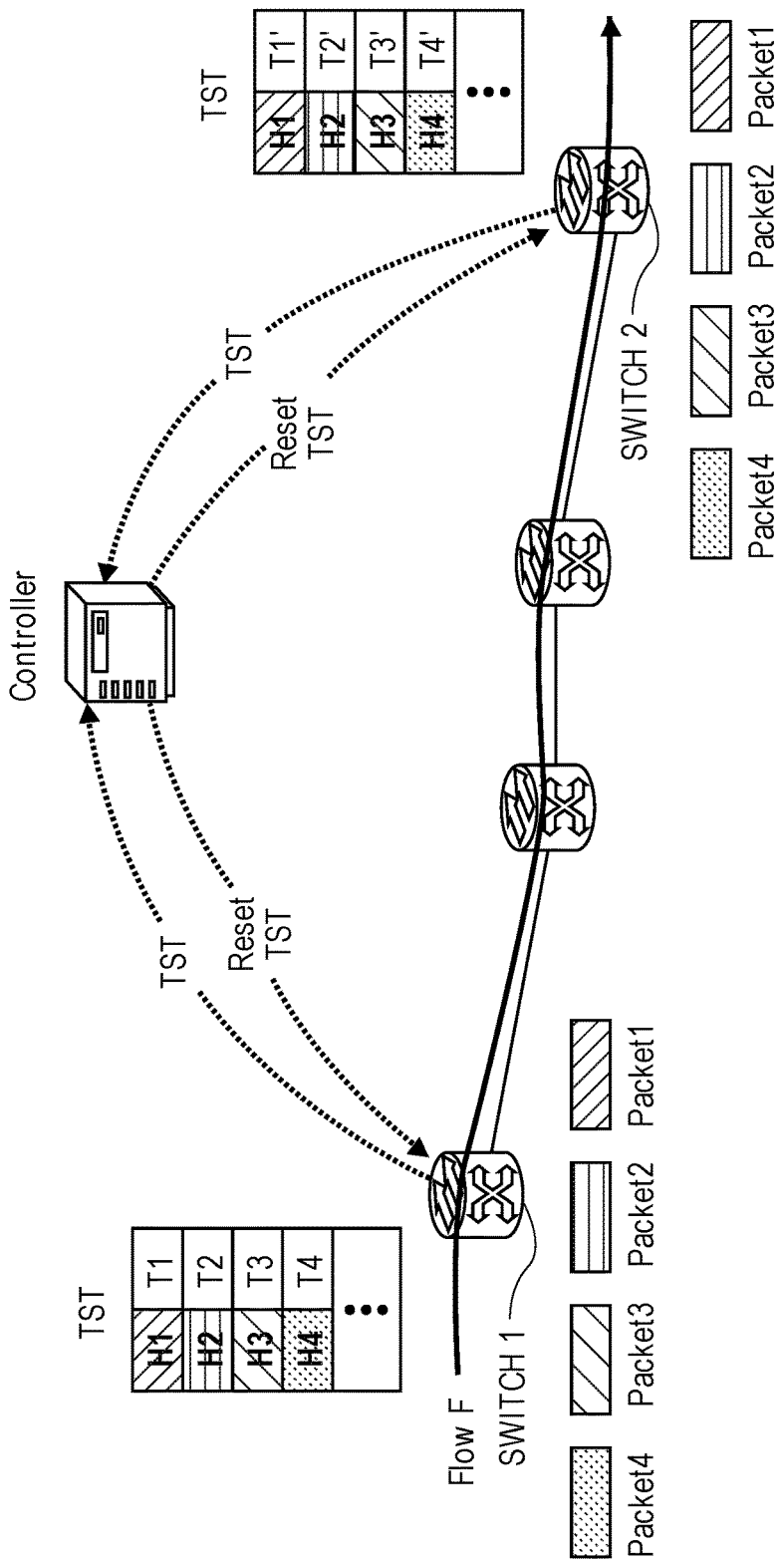
FIG. 4 is a diagram of an example of the measurement process in a software defined network.

FIG. 4 is a diagram of one example embodiment of a delay and loss measurement processed based on common entries of the timestamp table at a network ingress switch and egress switch. The basic method works well for measuring a small number of flows for a given time interval. In cases where it is desired to handle higher amounts of continuous information, the method can be adjusted to perform some levels of aggregations at the switches as described further herein below.

Instead of keeping one timestamp for each packet, the switches can perform aggregation for all the packets belonging to the same flow and maintain a single timestamp for a set of packets. In one embodiment, the method keeps a summation of all the packets of the same flow, by constructing the key of the hash as the common fields for all packets of the same flow. In this case, the process will produce one entry on each switch for each flow. In the illustrated example, the process keeps $S1=T1+T2+T3+T4$ on the first switch in FIG. 4.

Further the process keeps $S2=T1'+T2'+T3'+T4'$ on the second switch, where S1 and S2 are aggregated timestamp values and T1-T4' are individual packet timestamp values. Assuming there is no packet loss, then the process can also compute the average delay as $(S2-S1)/4$, since there are 4 entries. This method reduces the amount of resources required on each switch and the amount of information exchanged between the switch and the controller.

However, there are two improvements to be made to the basic aggregated process. First, what if there is packet loss? Then S2 and S1 are no longer comparable. Thus, the modified process needs to introduce another counter, which keeps track of the number of packets for each summation. In the illustrated example, the process can also maintain a counter for S1, which is $C1=4$, indicating that there are 4 packets contributing to S1. Similarly, the process can also maintain another counter C2 on S2. Therefore, the process can detect the packet loss by simply comparing C2 and C1. In this embodiment, the process only uses S1 and S2 to compute the delay if C1 and C2 are comparable.

The second issue with the aggregated process is that, as a consequence of the aggregation, the summation becomes unusable if there is any packet loss, which could be quite common over a large window. Thus, the process can utilize the summation over a small window size, e.g. 200 ms or every 10 packets. This way, the process reduces the likelihood of having lost packets in each summation. It also provides finer granularity of loss information, instead of just having one total loss number for the entire flow duration.

The third issue is that in some cases, knowing the average delay value sometimes is not sufficient. Thus, besides the summation, the process can also use another two entries in the hash table (i.e., the timestamp table) to keep the maximum and the minimum timestamps. This further provides data as to the range of the delay variance.

Even with the aggregation on the switches, there can still be significant issues on the service chaining environment, that is, services may modify the packets on the fly. Thus, if process uses the same hash function to match a packet before and after a service, it may not always guarantee that the process can capture the same packet. The process of adjusting for these modifications is discussed herein below with regard to FIGS. 6A and 6B.

Figure 5A:
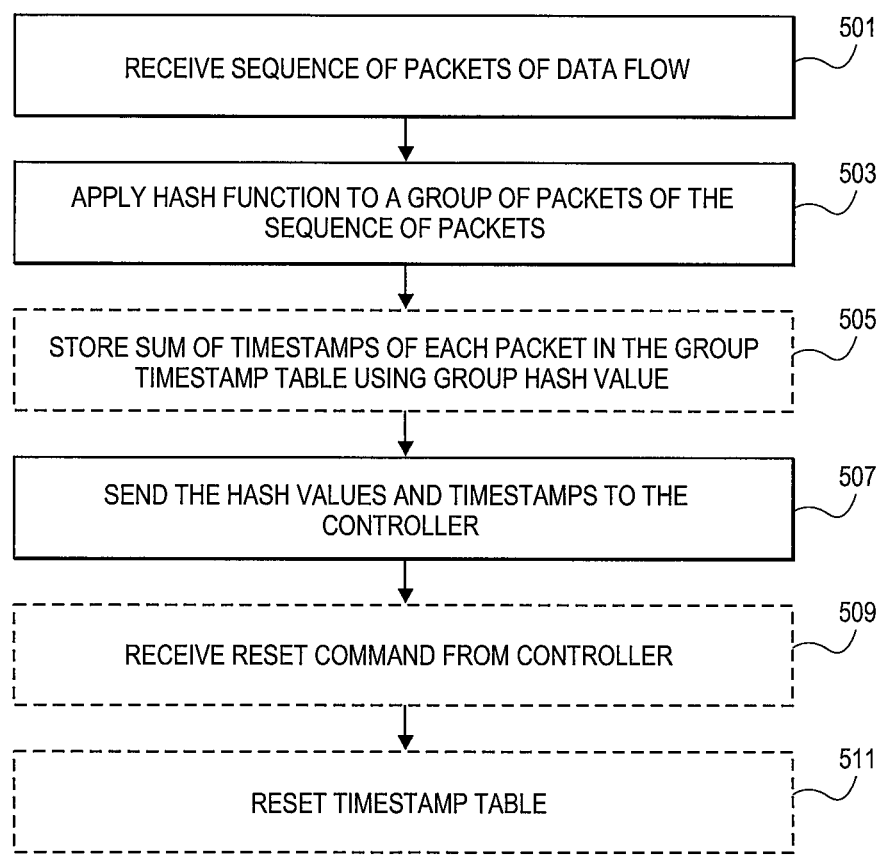
FIG. 5A is a flowchart of one embodiment of a process for aggregated measurement of delay and loss at a switch.
Figure 5B:
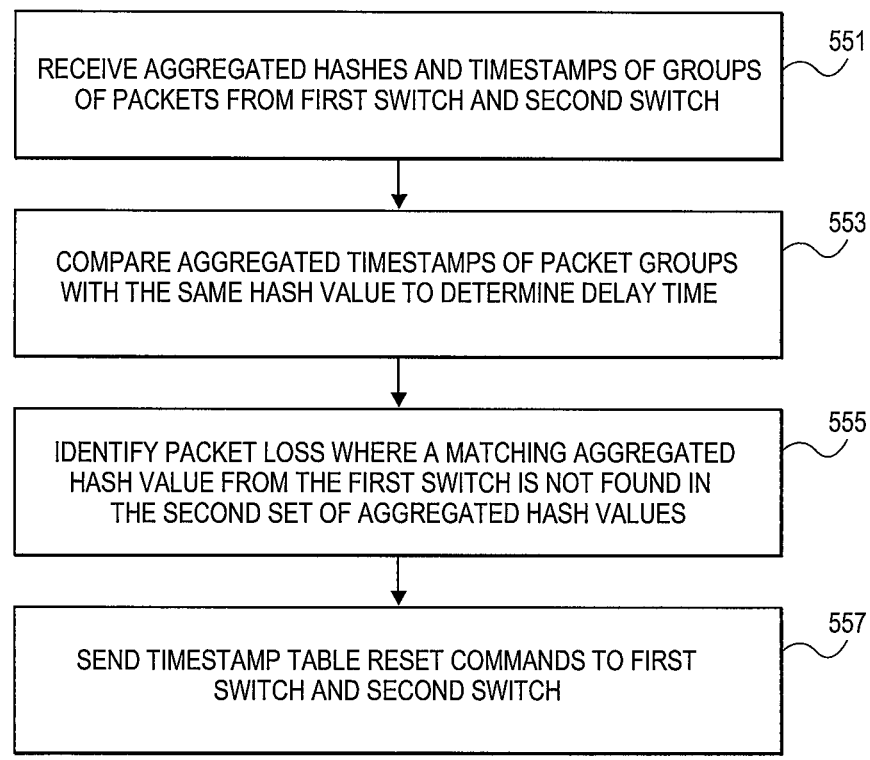
FIG. 5B is a flowchart of one embodiment of a process for aggregated measurement of delay and loss at a controller.

FIGS. 5A and 5B are example flowcharts of one embodiment of aggregated packet processing for measuring delay and loss of packets in an in-line service chain. In one embodiment, the process begins after initial configuration of the switches by the controller by receiving a sequence of data packets at a switch (Block 501). The sequence can be set to any length, such that a counter tracks a set of packets received for a particular data flow and when it exceeds a designated threshold, a hash function is applied to the packets individually or in aggregate (Block 503). The hash value generated for the group is utilized to store the set of timestamps in the timestamp table, the hash value is an index into the table to identify a storage location or similar mechanism is used (Block 505).

At predetermined intervals or as each group of packets is hashed, the hash values and the timestamps that have not yet been reported and/or acknowledged by the controller are sent to the controller (Block 507). The process can continue to receive and collect aggregated groups of packets and will reset the timestamp table upon receiving a command from the controller (Block 509). Receipt of the command indicates that the packets have been received and processed by the controller and that the switch can then clear and reclaim the space of the sent timestamps in the timestamp table (Block 511).

Similarly, in FIG. 5B the process as it is carried out by the controller is illustrated. The controller receives the aggregated timestamp data from a plurality of switches in the network. The process can be applied to any two switches from which data is received to determine a delay and packet loss between the switches and therefore over an intermediate middlebox or service.

The process begins with the receipt of aggregated hash values and timestamps for groups of packets (Block 551). This data can be received from any number of switches in the network, however, the examples will assume data received from two switches adjacent to an ingress and egress of a middlebox or service for sake of convenience and clarity. In the example illustrated embodiment, the data is received specifically from a first switch and a second switch. The data from the first switch can then be compared with the data from the second switch. The comparison can look to identify the same hash values being received from the first switch and the second switch, where a match occurs the timestamps or aggregated timestamp summation can be compared to determine the delay time between the two switches (Block 553).

Similarly, the packet loss can be identified where a hash value is identified at a first switch that is not reported by a second switch (Block 555). There can be a sequencing or time delay utilized to confirm that the hash value was not received and is not just delayed at the second switch. Adjusting for possible modification of the packets by the switches is discussed further herein below. Once the packet delay and loss have been calculated for a set of hash values, then a timestamp table reset command can be sent to both the first switch and the second switch, which enables those switches to free up space in their timestamp tables (Block 557).

Modeling for Middlebox Processing of Packets

To properly account for processing of data packets by the services, the process is designed based on a summarization of the possible modifications and their impact on the packets. Then the process relies on a model based method to intelligently construct the hash to handle such dynamics on the data path.

The types of modifications are important to the modeling process. Middleboxes modify packet headers and even map one session to another for performance optimization. For example, network address translation (NAT) will modify the address fields in the IP header of packets to translate the network addresses. Wide area network (WAN) optimizers and proxies may maintain persistent connections with the remote servers and aggregate several flows into one big session. Such modifications fundamentally prevent the capturing of the same packet at the two ends of a service using the standard hash functions. For example, in the basic design, if the process constructs the key of a hash based on the five tuples of the packet header, then the packet will not be captured or will be mapped to a different bucket after a NAT where the source address is changed. Similarly, a load balancer may also modify the destination address of a remote server.

On the other hand, some services may introduce performance changes to the packets themselves. For example, a firewall may intentionally drop all packets of a flow because a policy is violated. This will appear to be a severe packet loss because after the service no packet will be captured. However, it is not due to a network issue, but rather an expected behavior of the service. To overcome this challenge, it is first analyzed what the modifications are that middleboxes can do to the packets in the table below.

TABLE 1

Analysis of Middlebox Modifications

| Actions | Examples | Invariant fields |
|---|---|---|
| Drop a packet completely | Firewall, cache servers (when there is a hit, the request will not be sent forward) | None |
| Modify the header | NAT | Fields other than src/dst addresses and src port, e.g. packet payload |
| Modify the payload | Redundancy eliminator (they eliminate the redundant payload on the packets, not widely used) | Packet header |
| Modify both the header and payload | HTTP proxy (it operates on session based, it may modify HTTP header fields), WAN optimizer (it may map multiple users' request to one) | Some fields in the header and some fields in the payload |

A model of middlebox affect on packets can be derived from this categorization. According to the analysis above, the process provides a model for each middlebox. The model should include the following fields: (1) Type: indicates what type of middlebox; (2) Termination of flows: yes or no: if there is a chance that this service will terminate a flow; (3)

Remapping of flows: yes or no, if the service will map one incoming flow to another outgoing flow, including flow aggregation; (4) Drop packets: yes or no, if the service will drop a subset of the packets; (5) Delay packets: yes or no, if the service will introduce additional delay intentionally to the packet, e.g. rate limiter; (6) Modified fields: it is specified in the form of (a1,a2), (a3,a4) . . . (am, an), where am is the starting bit of the modified field, and an is the ending bit of the modified field. This specifies all the fields that this service may modify.

The process envisions that the model can be obtained by the basic understanding of the type of the middlebox, or be provided by the middlebox vendor. If the vendor is able to provide such information, then process can construct the invariant bits accurately. If for various reasons that the vendor is not willing to provide such information, the process can provide some coarse-grained information that can be obtained by understanding the type of the middlebox. For example, the types of modification shown in Table 1 are identified from the basic understanding of a few typical open source middleboxes. Moreover, as such understanding evolves, the model based approach can be improved more accurately.

The model once constructed can be provided to a switch or controller to construct a hash. A hash function refers to a function that compresses, resulting in an output shorter than the input. Often, such a function takes an input of arbitrary or almost arbitrary length, alternatively the hash function can take an input with a length that is a fixed number, for example 160 bits. Hash functions are used in many parts of cryptography, and there are many different types of hash functions, with different security properties.

The process can use any hash function to compute the digest of a packet, which maps a packet to a string that can be used to uniquely identify the packet. There are several requirements on the selection of hash function: (1) it can be implemented in hardware since the digest of the packet needs to be created in line speed to avoid introducing additional load to the switches; and (2) it needs to have low hash collisions under normal inputs of packets transmitted in the same flow.

The embodiments of the invention do not focus on a particular hash function. SHA1 is used herein as an example. However, one skilled in the art would understand that the process can be incorporated with other hash functions. SHA1 is a simple function that converts strings of almost arbitrary length to strings of 160 bits: M=SHA1(K,P), where K is the block size, where P is the x bits of the packets to be hashed and M is the corresponding digest. x is a configurable parameter.

In some embodiments, the following method to construct P. Assume that we need to measure the delay and loss rate of a service path of services S1, S2, and S3. According to the models of these three services, the process can gather that S1 will modify (x1, y1) bits, S2 will modify (x2, y2) and S3 will modify (x3, y3).

If a goal is to monitor only at the two ends of this path, meaning that the packet is captured once before S1, and once after S3, then the process can constructs the bits as the following: P=(1,k)−(x1,y1)−(x2,y2)−(x3,y3), assuming that k is the minimum length of packets in this flow.

On the other hand, the selection of P should be long enough to make sure any two packets in the same flow are not identical. If P is too small after the equation, then we have to use more monitoring points to separate the services so that we can have enough bits to monitor at each step.

Figure 6A:
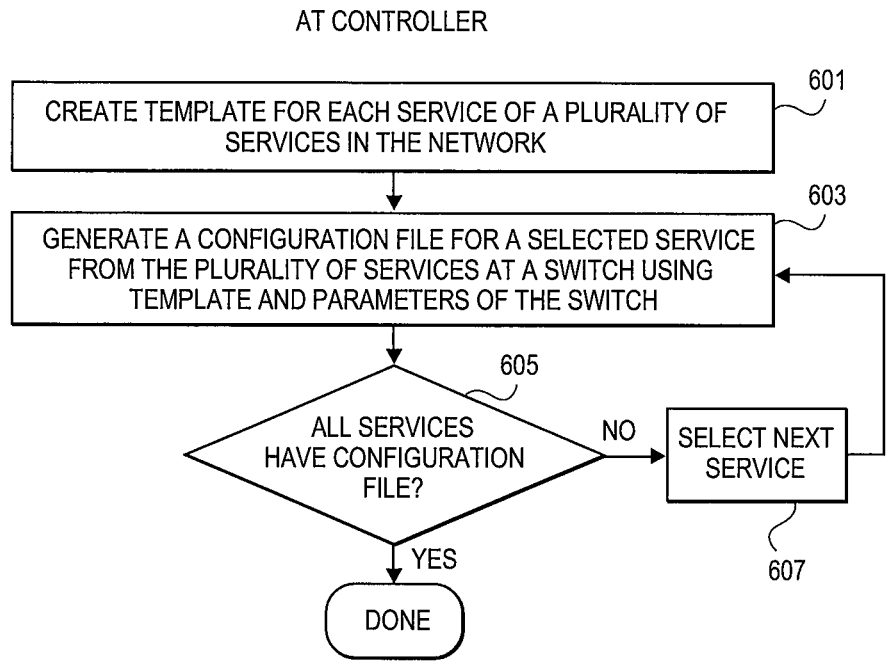
FIG. 6A is a flowchart for one embodiment of a process for generating a template at a controller.
Figure 6B:
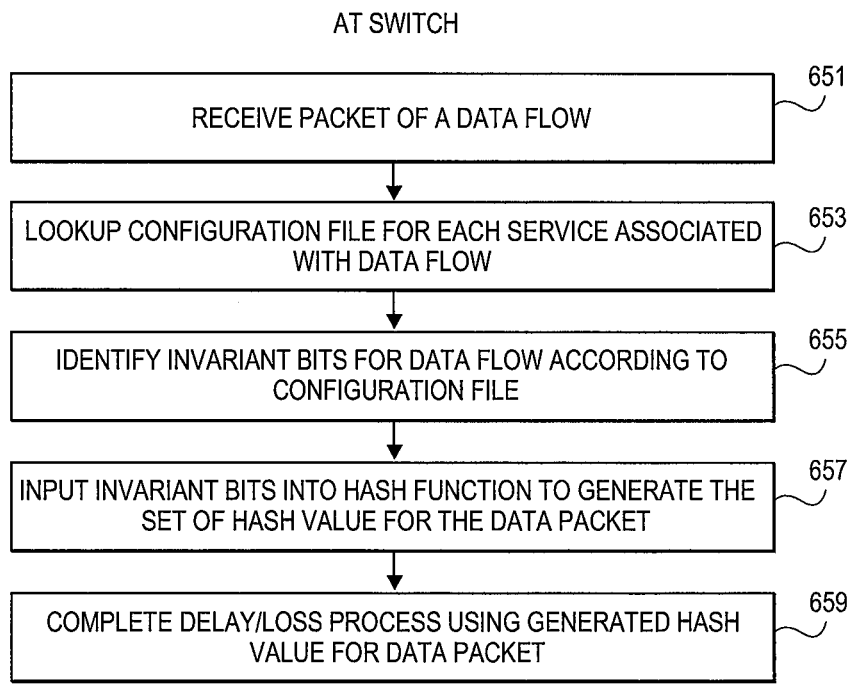
FIG. 6B is a flowchart for one embodiment of a process for measuring delay and loss according to a configuration file at a switch.

FIGS. 6A and 6B provide an example implementation of the modeling and configuration. In one embodiment, the process can be initiated to create a template for each service of a plurality of services in the network (Block 601). The templates can be created manually or by automated recognition of the characteristics of the service and categorization as set forth above. Once each of the templates has been created for each of the services, then the process generates a configuration file for a selected service to be configured (Block 603). The configuration file is constructed to be downloaded to the switch by the controller to configure the flow table or similar structure to hash a specified set of bits identified by the template. The template is applied along with the parameters of the switch to be configured to generate the configuration file according to the functionality of the switch, e.g. the switch implementing OpenFlow or similar flow control protocol.

A check can be performed to determine whether all of the services have been configured for a particular switch such that a configuration file has been constructed for each of the services (Block 605). If all of the services have not be processed to generate an associated configuration file, then the process can continue to select a next service to be processed (Block 607). If all of the services have been processed to generate a configuration file then the process can complete. In some embodiments, the configuration files that are so generated at the controller can be downloaded to the respective switches to implement the configuration at the switch using the associated flow control protocol.

FIG. 6B is a flowchart of one embodiment of the process being executed at the switch. The process is triggered at the switch by the receipt of data packets for a given flow to be measured (Block 651). On first receipt of a packet for a data flow the corresponding configuration file is looked up for each service associated with the data flow (Block 653). The process applies the configuration based on the underlying template to identify the invariant bits for the data flow (Block 655). These invariant bits are input into the hash function to generate the set of hash values for the input sequence of data packets for the data flow (Block 657). The process for completing the delay and loss measurement then proceeds as discussed herein above with regard to basic or aggregated delay and loss measurements (Block 659).

Network-Wide Root Cause Analysis

Assuming that the major issues that cause the performance degradation of a service path is the overloading of the switches and services, then the primary goal for service chaining OAM is to continuously monitor the entire service network to make sure no switch or service is overloaded. If a service or a switches is overloaded, it will introduce performance degradation to all the data flows that traverses it.

Thus, the problem being solved in this section is then, given all the measurement inputs, how to best locate the services that most likely cause the problem. Besides the overloading problem, the packets can also be dropped by the service intentionally. Thus, it is possible to use the model as described herein above to help further perform root cause analysis. The process creates a table that lists all the services. Each service contains a score that indicates the possibility of root cause. Each service also has three flags: 'isdelay' flag indicates if a data flow can introduce delay, 'isloss' flag indicates if a data flow can introduce loss; and 'isstop' flag indicates that if the data flow will stop the flow completely.

Next, the process goes through all the measurements of all flows from a given time window. The process increases the score of the service according to the loss rate of the measurement, if there is an indication that packets are unseen after this service. For delay, we attribute the total delay to the services evenly along the path. Finally, the process ranks the services based on their scores, average delay, and their flags according to the following rule.

The process first picks the service with highest loss score, if isloss=1 and isstop=1, remove it from the list, move to the one with next highest score. The process also creates a ranking by first looking at the delay value, and if isdelay=1 we remove it from the list, move to the one with next highest score. Finally, the process combines the ranking from both delay and loss. The intuition is that if a service or a switch is congested, it will appear to have both high packet loss and longer delay. Note that here S includes both switches and services.

On example of the detailed algorithm is shown below:

---
Algorithm 1 Root cause analysis algorithm
---

```
procedure Root_Cause_Analysis(M,S)
    for every measurement m ∈ M do
        for every service s that m traverses do
            if packet is lost after traversing s then
                s.loss = s.loss + m.loss
                s.delay = s.delay + m.delay
            end if
        end for
    end for
    sort S according to s.loss, stored in S_loss
    for each sorted S_loss do
        if s.isloss==TRUE OR s.isstop==TRUE then
            move s to the tail
        end if
    end for
    sort S according to s.delay, stored in S_delay
    for each sorted S_delay do
        if s.isdelay==TRUE then
            move s to the tail
        end if
    end for
    sort S according to their positions in both S_delay and S_loss
```

Root Cause Analysis Algorithm

FIG. 7 is a flowchart of one embodiment of the network root cause analysis. In one embodiment, the process in run periodically using the available collected measurement information. The process iterates through the measurements, by selecting a next measurement to process (Block 701). The process then selects a next service associated with the measurement, i.e., where the service is traversed by the measurement (Block 703). The process checks whether the a packet was lost after traversing the selected service (i.e., the corresponding hash had not been found per the processes set forth above) (Block 705). If the packet was lost, then an addition is made to the packet loss tally for the switch (Block 706). If the packet was not lost then the pack delay is added to the switch delay tally (Block 707). In either case, a check is then made whether all services have been processed (Block 709). If all of the services have not been processed then the next service is selected (Block 703). If all of the services have been serviced, then a check is made whether all the measurements have been processed (Block 711). If not all of the measurements have been processed, then the net measurement is selected (Block 701).

Once all of the services and measurements have been processed, then the process begins to sort them to identify those that are causing the most packet loss and delay based on their associated tallies. First a list of the switches is created and sorted by the switch packet loss tally thereby creating a sorted loss list (Block 713).

After the sorted loss list has been created, then a check can be made whether each switch is enabled to induce delay or to stop a data flow (Block 715). As discussed herein above, a configuration file for a switch can indicate it has been enabled to induce delay or stop a data flow. The list is sorted such that those switches inducing the greatest delay are positioned at the head of the list. If the switch is enabled to induce delay, then the switch can be moved to the end of the list thereby indicating that the switch will not be targeted as a cause, since it has been enabled explicitly to induce delay and stop data flows (i.e., cause loss).

Another list of switches is generated and sorted according to the packet delay tally for each switch, this generates a sorted delay list (Block 719). Each of the switches in the list is checked to determine whether the switch is enabled to induce delay (Block 721). As discussed above, this is designated by a flag in the associated configuration file generated for the switch. If the switch is enabled to induce delay, then the switch can be moved to the end of the list, which is organized with those switches causing the most delay being positioned at the head of the list (Block 723). This indicates that the enabled switch is not considered as a source for delay in the network. Finally, the two lists, the sorted loss list and the sorted delay list can be combined and sorted to create an overall list of the most problematic switches causing loss and delay in the network (Block 725). The process for combination can weight either loss or delay higher in precedence or they can be averaged or similarly combined to create a final list effectively ranking the most problematic switches.

The embodiments set forth herein above provides a new method for monitoring performance for inline service chaining. It can be used for both testing the implementation of the service chain after it is installed, and for continuous monitoring during the run time. The solution can be used in any types of network, together with any traffic steering mechanism, to reduce the monitoring overhead in the network.

Figure 8:
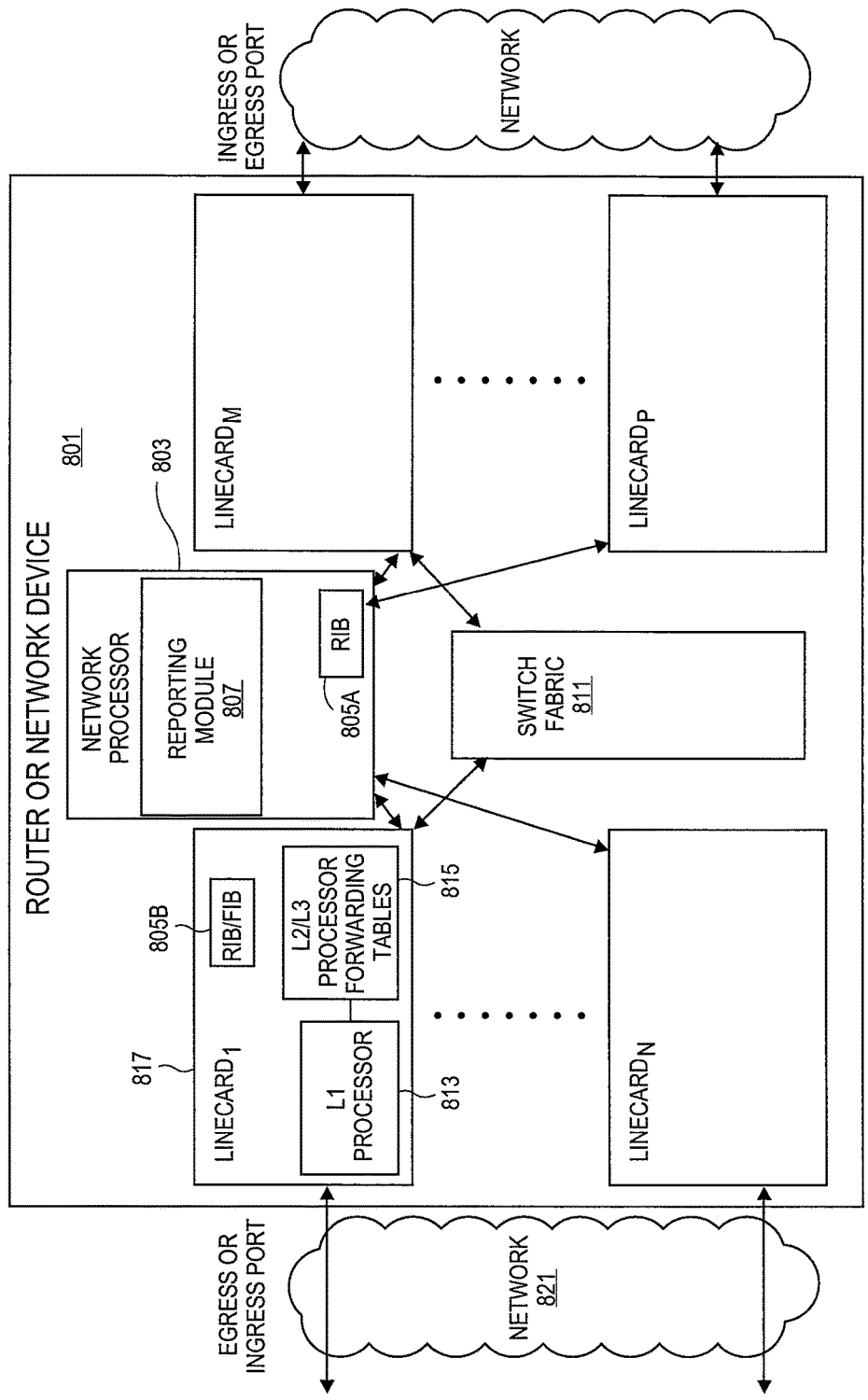
FIG. 8 is a diagram of one embodiment of a network device implementing a switch in the software defined network and executing any of the functions of the switch defined herein above.

FIG. 8 is a diagram of one embodiment of a network device implementing a switch in the software defined network and executing any of the functions of the switch defined herein above.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a network device 801 or similar computing device. The network device 801 can have any structure that enables it to receive data traffic and forward it toward its destination. The network device 801 can include a network processor 803 or set of network processors that execute the functions of the network device 801. A 'set,' as used herein, is any positive whole number of items including one item. The network device 801 can execute a reporting module 807 to implement the functions of a switch with relation to measurement of delay and loss (including aggregated and non-aggregated measurements) and implementation of configuration according to a model and configuration file determined by the controller.

The network processor 803 can implement the reporting module 807 discrete hardware, software module or any combination thereof. The network processor 803 can also service the routing information base 805A and similar functions related to data traffic forwarding and network topology maintenance. The routing information base 805A can be implemented as match action tables that are utilized for forwarding protocol data units PDUs (i.e. packets). The functions of the reporting module 807 can be implemented as modules in any combination of software, including firmware, and hardware within the network device. The functions of the reporting module 807 that are executed and implemented by the network device 801 include those described further herein above.

In one embodiment, the network device 801 can include a set of line cards 817 that process and forward the incoming data traffic toward the respective destination nodes by identifying the destination and forwarding the data traffic to the appropriate line card 817 having an egress port that leads to or toward the destination via a next hop. These line cards 817 can also implement the forwarding information base 805B, or a relevant subset thereof. The line cards 817 can also implement or facilitate the reporting module 807 functions described herein above. The line cards 817 are in communication with one another via a switch fabric 811 and communicate with other nodes over attached networks 821 using Ethernet, fiber optic or similar communication links and media.

As described herein, operations performed by the network device 801 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A). In some embodiments, the control communication and configuration module 932A can implement the reporting module 933A, which implements the switch functions for configuration and measurement of delay and loss described herein above.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate a hypervisor 954 (sometimes referred to as a virtual machine monitor (VMM)) and one or more virtual machines 962A-R that are run by the hypervisor 954, which are collectively referred to as software instance(s) 952. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 962A-R, and that part of the hardware 940 that executes that virtual machine (be it hardware dedicated to that virtual machine and/or time slices of hardware temporally shared by that virtual machine with others of the virtual machine(s) 962A-R), forms a separate virtual network element(s) 960A-R.

The virtual network element(s) 960A-R perform similar functionality to the virtual network element(s) 930A-R. For instance, the hypervisor 954 may present a virtual operating platform that appears like networking hardware 910 to virtual machine 962A, and the virtual machine 962A may be used to implement functionality similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 962A-R differently. For example, while embodiments of the invention are illustrated with each virtual machine 962A-R corresponding to one VNE 960A-

R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In addition the virtual network elements 960A-R and virtual machines 962A-R can implement the functions of a reporting module 963A-R as described herein above where the reporting module 963A-R implements the switch functions for configuration and delay and loss measurement.

In certain embodiments, the hypervisor 954 includes a virtual switch that provides similar forwarding services as a physical Ethernet switch. Specifically, this virtual switch forwards traffic between virtual machines and the NIC(s) 944, as well as optionally between the virtual machines 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the virtual machines 962A-R may operate as servers; the same would be true for the hybrid network device 906; in the case of the special-purpose network device 902, one or more such servers could also be run on a hypervisor executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In embodiments that use compute virtualization, the processor(s) 1042 typically execute software to instantiate a hypervisor 1054 (sometimes referred to as a virtual machine monitor (VMM)) and one or more virtual machines 1062A-R that are run by the hypervisor 1054; which are collectively referred to as software instance(s) 1052. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 1050 (illustrated as CCP instance 1076A) on top of an operating system 1064A are typically executed within the virtual machine 1062A. In embodiments where compute virtualization is not used, the CCP instance 1076A on top of operating system 1064A is executed on the "bare metal" general purpose control plane device 1004.

The operating system 1064A provides basic processing, input/output (I/O), and networking capabilities. In some embodiments, the CCP instance 1076A includes a network controller instance 1078. The network controller instance 1078 includes a centralized reachability and forwarding information module instance 1079 (which is a middleware layer providing the context of the network controller 978 to the operating system 1064A and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device to monitor the performance of packet processing in an in-line service chain, the network device one of a plurality of network devices forming a software defined network (SDN) and the in-line service chain, the SDN including a controller to configure the plurality of network devices, the method comprising the steps of:
receiving a sequence of packets of a data flow traversing the in-line service chain;
applying a hash function to the sequence of packets of the data flow to generate a set of hash values for the sequence of packets, the hash function using a set of invariant bits associated with services in the in-line service chain that affect the data flow, wherein the set of invariant bits are identified to be invariant amongst all the services in the in-line service chain; and
sending the set of hash values and a set of timestamps for the sequence of packets to the controller to determine delay and loss across a service of the in-line service chain,
wherein the identification of the set of invariant bits comprises the steps of:
looking up a configuration file for each service associated with the data flow;
identifying the set of invariant bits for the data flow based on each configuration file, wherein each configuration file is generated based on a template associated with a corresponding service; and
inputting the set of invariant bits into the hash function to generate the set of hash values.

2. The method of claim 1, further comprising the steps of:
storing a hash value and timestamp of each packet in the sequence in a timestamp table;
receiving a reset command from the controller; and
resetting the timestamp table.

3. The method of claim 1, further comprising the step of:
aggregating the set of hash values and the set of timestamps for the sequence of packets to be sent to the controller.

4. A method implemented by a computing device to monitor the performance of packet processing in an in-line service chain, the computing device in communication with a plurality of network devices forming a software defined network (SDN) and the in-line service chain, the SDN including a controller implemented by the computing device to configure the plurality of network devices, the plurality of network devices including a first switch and a second switch positioned across a service in the in-line service chain traversed by packets of a data flow, the first switch generating a first set of hash values and a first set of timestamps for the packets, the second switch generating a second set of hash values and a second set of timestamps for the packets, the method comprising the steps of:
receiving the first set of hash values and the first set of timestamps from the first switch and the second set of hash values and the second set of timestamps from the second switch, where the first set of hash values and second set of hash values are generated using a hash function and a set of invariant bits associated with services in the in-line service chain that affect the data flow, wherein the set of invariant bits are identified to be invariant amongst all the services in the in-line service chain;
comparing a timestamp of the first set of time stamps with a second timestamp of the second set of timestamps having a same hash value to determine a delay time;
identifying packet loss where a matching hash value for a hash value from the first set of hash values is not found in the second set of hash values; and
sending timestamp table reset commands to the first switch and the second switch,
wherein the identification of the set of invariant bits comprises the steps of:
looking up a configuration file for each service associated with the data flow,
identifying the set of invariant bits for the data flow based on each configuration file, wherein each configuration file is generated based on a template associated with a corresponding service, and
inputting the set of invariant bits by the first switch into the hash function to generate the first set of hash values and inputting the set of invariant bits by the second switch into the hash function to generate the second set of hash values.

5. The method of claim 4, the method further comprising the steps:
creating a template for each service of a plurality of services in the SDN; and
generating a configuration file for a selected service from the plurality of services for a switch in the SDN using a template for the selected service and parameters of the switch.

6. The method of claim 4, wherein the first set of hash values from the first switch are aggregated and the second set of hash values from the second switch are aggregated.

7. A network device to monitor the performance of packet processing in an in-line service chain, the network device one of a plurality of network devices forming a software defined network (SDN) and the in-line service chain, the SDN including a controller to configure the plurality of network devices, the network device comprising:
a non-transitory machine-readable medium having stored therein a monitoring module; and
a network processor configured to execute a reporting module, the reporting module configured to receive a sequence of packets of a data flow traversing the in-line service chain, apply a hash function to the sequence of packets of the data flow to generate a set of hash values for the sequence of packets, where the hash function uses a set of invariant bits associated with services in the in-line service chain that affect the data flow, wherein the set of invariant bits are identified to be invariant amongst all the services in the in-line service chain, and send the set of hash values and a set of timestamps for the sequence of packets to the controller to determine delay and loss across a service of the in-line service chain,
wherein the identification of the set of invariant bits comprises the steps of:
looking up a configuration file for each service associated with the data flow,
identifying the set of invariant bits for the data flow based on each configuration file, wherein each configuration file is generated based on a template associated with a corresponding service, and
inputting the set of invariant bits into the hash function to generate the set of hash values.

8. The network device of claim 7, wherein the reporting module is further configured to aggregate the set of hash values and the set of timestamps for the sequence of packets to be sent to the controller.

9. The network device of claim 7, wherein the reporting module is further configured to store a hash value and timestamp of each packet in the sequence in a timestamp table, receive a reset command from the controller, and reset the timestamp table.

10. A computing device implementing a plurality of virtual machines for implementing network function virtualization (NFV), wherein a virtual machine from the plurality of virtual machines is configured to execute a method to monitor the performance of packet processing in an in-line service chain, the computing device in communication with a plurality of network devices forming a software defined network (SDN) and the in-line service chain, the SDN including a controller implemented by the computing device to configure the plurality of network devices, the plurality of devices including a first switch and a second switch positioned across a service in the in-line service chain traversed by a packets of a data flow, the first switch generating a first set of hash values and a first set of timestamps for the packets, the second switch generating a second set of hash values and a second set of timestamps for the packets, the computing device comprising:

a non-transient machine-readable medium having stored therein a monitor module; and a processor configured to execute the virtual machine, the virtual machine to implement the monitor module, the monitor module configured to receive the first set of hash values and the first set of timestamps from the first switch and the second set of hash values and the second set of timestamps from the second switch, where the first set of hash values and second set of hash values are generated using a hash function and a set of invariant bits associated with services in the in-line service chain that affect the data flow, wherein the set of invariant bits are identified to be invariant amongst all the services in the in-line service chain, to compare a timestamp of the first set of time stamps with a second timestamp of the second set of timestamps having a same hash value to determine a delay time, to identify packet loss where a matching hash value for a hash value from the first set of hash values is not found in the second set of hash values, and to send timestamp table reset commands to the first switch and the second switch, wherein the identification of the set of invariant bits comprises the steps of:

looking up a configuration file for each service associated with the data flow, identifying the invariant bits for the data flow based on each configuration file, wherein each configuration file is generated based on a template associated with a corresponding service, and inputting the set of invariant bits by the first switch into the hash function to generate the first set of hash values and inputting the set of invariant bits by the second switch into the hash function to generate the second set of hash values.

11. The computing device of claim 10, wherein the first set of hash values from the first switch are aggregated and the second set of hash values from the second switch are aggregated.

12. The computing device of claim 10, wherein the monitor module is further configured to create a template for each service of a plurality of services in the SDN, and to generate a configuration file for a selected service from the plurality of services for a switch in the SDN using a template for the selected service and parameters of the switch.

13. A control plane device to monitor the performance of packet processing in an in-line service chain, the control plane device in communication with a plurality of network devices forming a software defined network (SDN) and the in-line service chain, the SDN including a controller implemented by the control plane device to configure the plurality of network devices, the plurality of network devices including a first switch and a second switch positioned across a service in the in-line service chain traversed by packets of a data flow, the first switch generating a first set of hash values and a first set of timestamps for the packets, the second switch generating a second set of hash values and a second set of timestamps for the packets, the control plane device comprising:

a non-transitory machine-readable medium having stored therein a monitor module; and a processor configured to execute the monitor module, the monitor module configured to receive the first set of hash values and the first set of timestamps from the first switch and the second set of hash values and the second set of timestamps from the second switch, where the first set of hash values and second set of hash values are generated using a hash function and a set of invariant bits associated with services in the in-line service chain that affect the data flow, wherein the set of invariant bits are identified to be invariant amongst all the services in the in-line service chain, to compare a timestamp of the first set of time stamps with a second timestamp of the second set of timestamps having a same hash value to determine a delay time, to identify packet loss where a matching hash value for a hash value from the first set of hash values is not found in the second set of hash values, and to send timestamp table reset commands to the first switch and the second switch, wherein the identification of the set of invariant bits comprises the steps of:

looking up a configuration file for each service associated with the data flow, identifying the set of invariant bits for the data flow based on each configuration file, wherein each configuration file is generated based on a template associated with a corresponding service, and inputting the set of invariant bits by the first switch into the hash function to generate the first set of hash values and inputting the set of invariant bits by the second switch into the hash function to generate the second set of hash values.

14. The control plane device of claim 13, wherein the monitor module is further configured to create a template for each service of a plurality of services in the SDN, and to generate a configuration file for a selected service from the plurality of services for a switch in the SDN using a template for the selected service and parameters of the switch.

15. The control plane device of claim 13, wherein the first set of hash values from the first switch are aggregated and the second set of hash values from the second switch are aggregated.

16. A computing device implementing a plurality of virtual machines for implementing network function virtualization (NFV), wherein a virtual machine from the plurality of virtual machines is configured to execute a method to monitor the performance of packet processing in an in-line service chain, the network device one of a plurality of network devices forming a software defined network (SDN) and the in-line service chain, the SDN including a controller to configure the plurality of network devices, the computing device comprising:

a non-transitory machine-readable medium having stored therein a monitoring module; and a processor configured to execute the virtual machine, the virtual machine to implement a reporting module, the reporting module configured to receive a sequence of packets of a data flow traversing the in-line service chain, apply a hash function to the sequence of packets of the data flow to generate a set of hash values for the sequence of packets, where the hash function uses a set of invariant bits associated with services in the in-line service chain that affect the data flow, wherein the set of invariant bits are identified to be invariant amongst all the services in the in-line service chain, and send the set of hash values and a set of timestamps for the sequence of packets to the controller to determine delay and loss across a service of the in-line service chain, wherein the identification of the set of invariant bits comprises the steps of:

looking up a configuration file for each service associated with the data flow, identifying the set of invariant bits for the data flow based on each configuration file, wherein each configuration file is generated based on a template associated with a corresponding service, and inputting the set of invariant bits into the hash function to generate the set of hash values.

17. The computing device of claim 16, wherein the reporting module is further configured to aggregate the set of hash values and the set of timestamps for the sequence of packets to be sent to the controller.

18. The computing device of claim 16, wherein the reporting module is further configured to store a hash value and timestamp of each packet in the sequence in a timestamp table, receive a reset command from the controller, and reset the timestamp table.

* * * * *